US012744343B2

(12) United States Patent
Horner et al.

(10) Patent No.: US 12,744,343 B2
(45) Date of Patent: Sep. 22, 2026

(54) SYSTEMS AND METHODS FOR ELECTRICAL CONNECTOR HOUSING BODY AND ENCLOSED CIRCUIT BOARD

(71) Applicant: IDEAL Industries, Inc., Sycamore, IL (US)

(72) Inventors: Richard Scott Horner, Marlborough, MA (US); Joshua Haney, Fitchburg, MA (US); Nicolas Bisi, Christchurch (NZ); Kevin Vernon, Christchurch (NZ)

(73) Assignee: IDEAL Industries, Inc., Sycamore, IL (US)

( * ) Notice: Subject to any disclaimer, the term of this patent is extended or adjusted under 35 U.S.C. 154(b) by 370 days.

(21) Appl. No.: 18/262,017

(22) PCT Filed: Feb. 12, 2021

(86) PCT No.: PCT/US2021/017944

§ 371 (c)(1),
(2) Date: Jul. 19, 2023

(87) PCT Pub. No.: WO2022/173446

PCT Pub. Date: Aug. 18, 2022

(65) Prior Publication Data

US 2024/0297455 A1 Sep. 5, 2024

(51) Int. Cl.

*H01R 13/428* (2006.01)
*H01R 13/52* (2006.01)

(Continued)

(52) U.S. Cl.

CPC ......... *H01R 13/428* (2013.01); *H01R 13/521* (2013.01); *H01R 13/6683* (2013.01); *H01R 13/6691* (2013.01); *H01R 43/20* (2013.01)

(58) Field of Classification Search

CPC ...... H01R 11/05; H01R 12/718; H01R 13/14; H01R 13/426; H01R 13/428;

(Continued)

(56) References Cited

U.S. PATENT DOCUMENTS 3,069,652 A 12/1962 Greco
4,335,931 A * 6/1982 Kinnear ................ H01R 13/28 439/744

(Continued)

FOREIGN PATENT DOCUMENTS

CN 203967272 U 11/2014
JP S55158691 U 11/1980

(Continued)

OTHER PUBLICATIONS

Office Action from JP application No. 2023-548209, dated Jan. 7, 2025, 7 pp.

(Continued)

*Primary Examiner* — Abdullah A Riyami
*Assistant Examiner* — Thang H Nguyen
(74) *Attorney, Agent, or Firm* — Greenberg Traurig, LLP

(57) ABSTRACT

An electrical connector includes a connector housing configured to receive at least one electrical contact. The electrical connector further includes a circuit board enclosed within the connector housing. The electrical connector further includes at least one electrical lead configured to electrically connect the circuit board to the at least one electrical contact.

14 Claims, 18 Drawing Sheets

(51) Int. Cl.
*H01R 13/66* (2006.01)
*H01R 43/20* (2006.01)

(58) Field of Classification Search
CPC ............................ H01R 13/521; H01R 13/533; H01R 13/6658; H01R 13/6683; H01R 13/6691; H01R 2103/00; H01R 2201/26; H01R 4/20; H01R 4/48; H01R 43/20
See application file for complete search history.

(56) References Cited

U.S. PATENT DOCUMENTS

| | | | | |
|---|---|---|---|---|
| 6,285,551 | B1 | 9/2001 | Brandenburg et al. | |
| 7,374,460 | B1 * | 5/2008 | Hariharesan | H01R 13/642 439/691 |
| 9,293,870 | B1 * | 3/2016 | Koczwara | H01R 12/724 |
| 10,027,046 | B1 * | 7/2018 | Phillips | H01R 12/721 |
| 10,103,465 | B2 | 10/2018 | Amini et al. | |
| 11,218,007 | B1 * | 1/2022 | Moubedi | H02J 7/62 |
| 2005/0233606 | A1 * | 10/2005 | Liao | H01R 12/7082 439/66 |
| 2009/0093149 | A1 * | 4/2009 | Mancini | H01R 13/26 439/259 |
| 2013/0217264 | A1 * | 8/2013 | Endo | H01R 12/721 439/630 |
| 2014/0177161 | A1 * | 6/2014 | Chang | G06F 1/1613 361/679.32 |
| 2014/0313675 | A1 * | 10/2014 | Choo | H05K 7/20854 29/841 |
| 2019/0027875 | A1 * | 1/2019 | Parks | H01R 25/006 |
| 2020/0203896 | A1 * | 6/2020 | Wu | G01K 11/265 |
| 2020/0259301 | A1 * | 8/2020 | Schmitz | H01R 13/6691 |
| 2023/0243396 | A1 * | 8/2023 | Li | F16F 1/18 267/158 |

FOREIGN PATENT DOCUMENTS

| | | | | | |
|---|---|---|---|---|---|
| JP | 2018206740 | A | | 12/2018 | |
| JP | 2020064724 | | * | 4/2020 | H01R 13/24 |
| JP | 2020064724 | A | | 4/2020 | |
| JP | 2020515201 | A | | 5/2020 | |
| TW | 201403954 | A | | 1/2014 | |
| WO | WO-2018016261 | A1 | * | 1/2018 | B60R 16/02 |

OTHER PUBLICATIONS

Extended Search Report from EP application No. 21925992.6, dated Oct. 10, 2024, 8 pp.

Office Action from Indian application No. 202317046502, dated Jul. 31, 2025, 6 pp.

ISA/US, Int. Search Report issued on PCT application No. PCT/US2021/17944, dated Jun. 21, 2021, 4 pages.

ISA/US, Written Opinion issued on PCT application No. PCT/US2021/17944, dated Jun. 21, 2021, 8 pages.

Office Action from Taiwanese patent application No. 111104126, notification date Jul. 26, 2023, 9 pp.

Office Action from Korean application No. 10-2023-7028546, dated Nov. 28, 2024, 9 pp.

* cited by examiner

FIG. 6
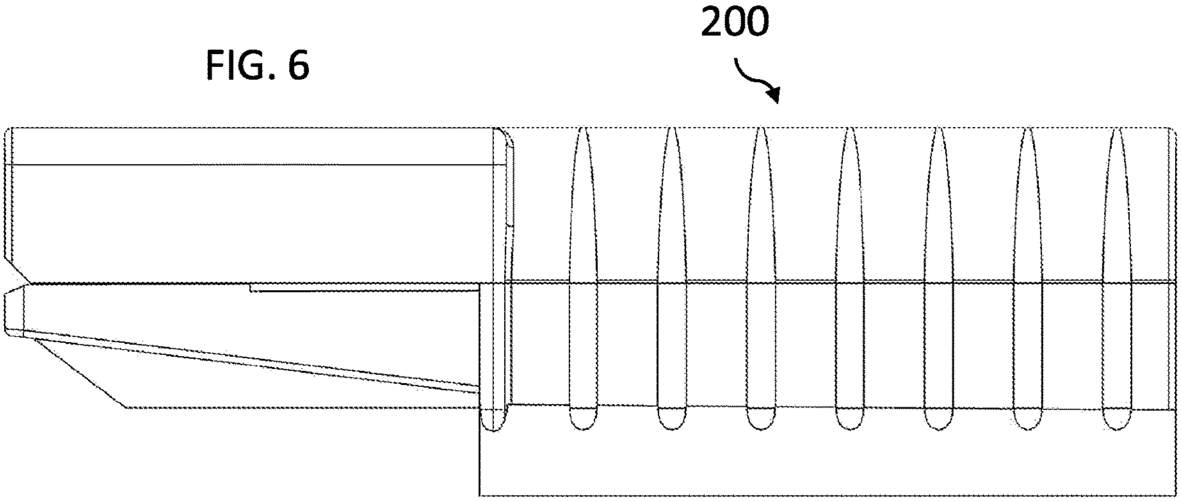
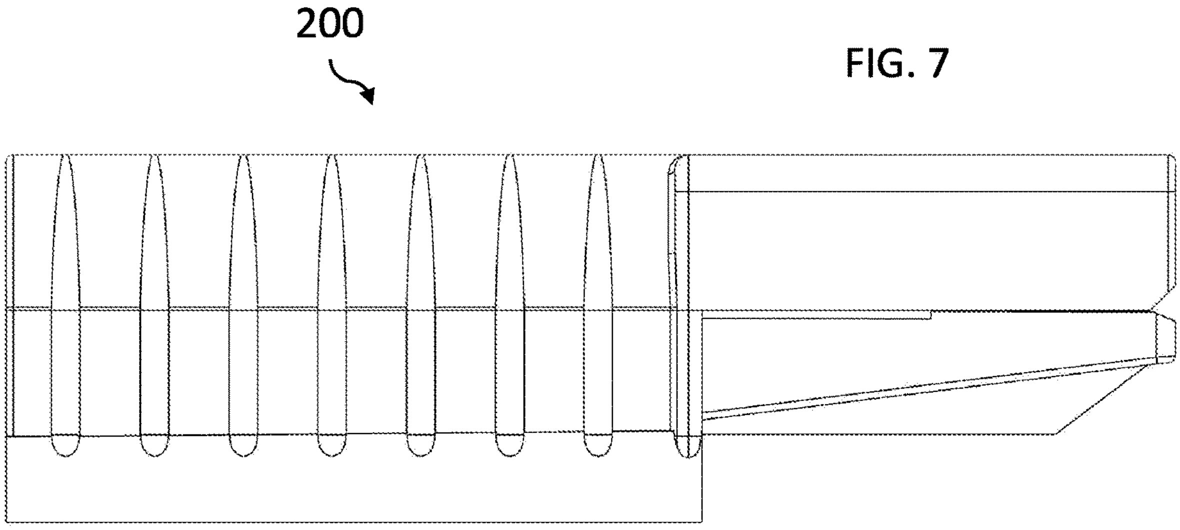
FIG. 7

SYSTEMS AND METHODS FOR ELECTRICAL CONNECTOR HOUSING BODY AND ENCLOSED CIRCUIT BOARD

FIELD OF THE DISCLOSURE

The present description relates generally to electrical connectors, methods for assembling electrical connectors, and more particularly to an electrical connector housing that encloses a circuit board therein.

BACKGROUND OF RELATED ART

In general, electrical connectors, including flat-wiping contact connectors, are known in the art. For example, flat-wiping contact technology may be used in applications such as electrical power connections for materials handling trucks, and single pole and dual pole flat wiping contact connectors may be used for storage battery connections.

In one example, US Patent Application Publication No. 2009/0093149, incorporated herein by reference in its entirety, describes a flat-wiping contact and methods for producing them. For example, a plastic housing may be molded with a passageway or channel through the housing having a large backside opening intended for a conductor and a more defined front end opening for making the electrical connection to a mating connector. The passageway is configured with sidewall slots for locating and retaining a leaf spring that in turn retains the contact and provides the necessary wiping pressure for the contact when mated to another connector.

A method for assembling such connectors may include inserting the spring into the housing through the large backside opening where it is locked into position in its slots by cold forming (staking) a portion of the plastic housing up behind the back end of the spring after the spring is inserted. External of the housing, a flat wiping contact is mated to a suitable conductor. The contact is then installed in the housing through the large back end opening, being slid forward until it latches over the front end of the spring.

While the noted electrical connectors may be suitable for their intended purposes, there remains a strong desire for improved flat-wiping connectors that require easier assembly but still perform as a flat-wiping connector.

SUMMARY

Described herein are electrical connectors and methods for assembling electrical connectors that are configured to receive at least one electrical contact and enclose a circuit board within a connector housing of the electrical connectors. The electrical connectors further include at least one electrical lead configured to electrically connect the circuit board to the at least one electrical contact that may be inserted into the connector housing.

A better appreciation of the objects, advantages, features, properties, and relationships of the subject matter disclosed herein will be obtained from the following detailed description and accompanying drawings which set forth illustrative examples which are indicative of the various ways in which the principles of the described embodiments may be employed.

BRIEF DESCRIPTION OF THE DRAWINGS

FIG. 6 is a front elevational view of the electrical connector housing of FIG. 2 in accordance with the teachings of the present disclosure.

FIG. 7 is a rear elevational view of the electrical connector housing of FIG. 2 in accordance with the teachings of the present disclosure.

DETAILED DESCRIPTION

Figure 1A:
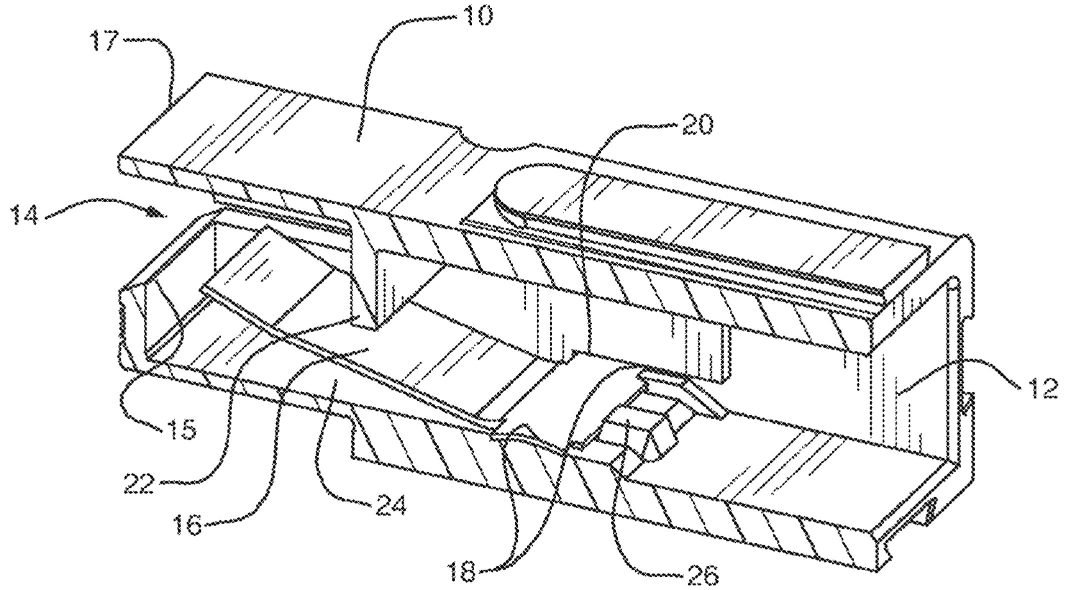
FIG. 1A (PRIOR ART)
FIG. 1A is a cross-sectional perspective view of an example electrical connector housing for a flat-wiping contact with a cold formed stake.

The following description of example methods and apparatus is not intended to limit the scope of the description to the precise form or forms detailed herein. Instead the following description is intended to be illustrative so that others may follow its teachings.

Described herein are electrical connectors and methods for assembling electrical connectors that are configured to receive at least one electrical contact and enclose a circuit board within a connector housing of the electrical connectors. The electrical connectors further include at least one electrical lead configured to electrically connect the circuit board to the at least one electrical contact that may be inserted into the connector housing.

Electrical connectors may be sized and rated differently for different uses. For example, the electrical contacts within a connector housing may be of varying sizes or may be made of varying materials depending on the intended use of the electrical contact. Similarly, a housing of an electrical connector, and may be shaped and sized based for specific uses and may be made out of varying insulating materials as desired. For example, some electrical connectors may be used to connect wiring of an electric vehicle to batteries to power the vehicle. Thus, the electrical connector may be designed based on the expected amperage (current) that will flow through the connector and a voltage of the system.

As just one example, an electrical connector may be designed for 300 to 500 amps of current to flow through it. If the electrical connector is used for higher current flow than 500 amps, the electrical contact in the electrical connector may radiate excessive heat, which may in turn compromise the integrity of the electrical connector housing. This may be referred to as thermal runaway. For example, the electrical connector housing may warp, melt, etc. during a thermal runaway incident. In addition to using a connector for higher current flow than intended, thermal runaway may also occur if an electrical contact is not properly inserted into the housing, if the electrical contact is not properly contacting a second contact of a second connector, or if a wire is not properly crimped or otherwise affixed to an electrical contact. In any of these examples, failure of the electrical connector is possible. Even if the electrical connector does not completely fail, a malfunctioning electrical connector may have adverse effects on a load or power source that the electrical connector electrically connects together.

Accordingly, disclosed herein are various electrical connector housing bodies and enclosed circuit boards that may be used to monitor for excessive heat indicative of a thermal runaway incident or measure other aspects of electricity flowing through an electrical connector to detect misuse of the electrical connector that may cause the electrical connector to fail or otherwise damage a load or power source connected by the electrical connector. A circuit board in an electrical connector may be used for other purposes as well, such as communicating with other computing devices via a wireless transceiver, a radio frequency identification (RFID) tag and/or reader, and/or any other type of wireless communication device.

Figure 1B:
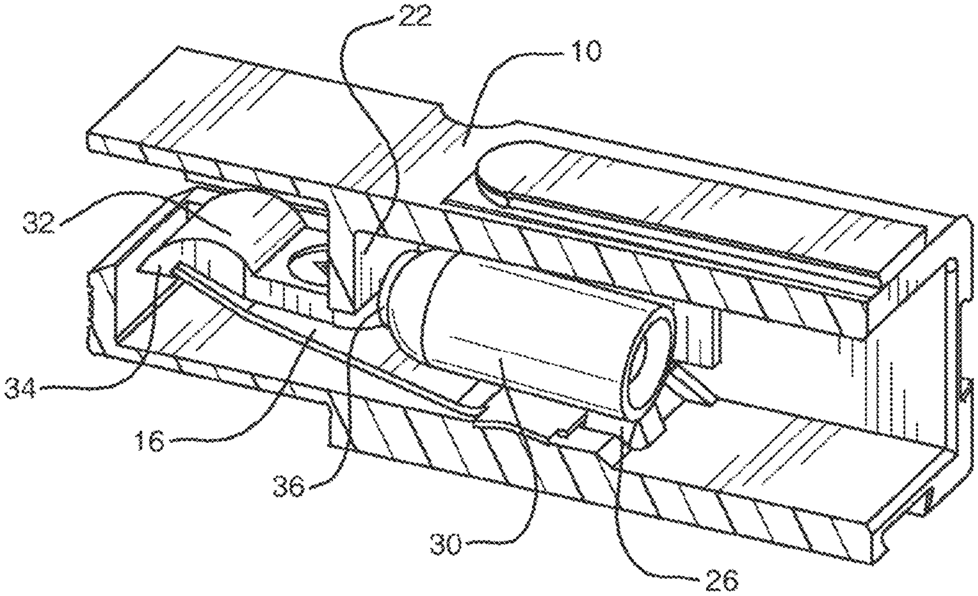
FIG. 1B (PRIOR ART)
FIG. 1B is a cross-sectional perspective view of the example electrical connector housing of FIG. 1A with the flat-wiping contact installed.

Referring to FIGS. 1A and 1B, an example of a housing and a spring that does not have a circuit board enclosed therein is shown. In particular, FIGS. 1A and 1B illustrate a perspective view of a single pole housing 10 for a flat wiping connector, sectioned to reveal the interior details.

Backend opening 12 and front end opening 14 define a passageway, channel, or chamber through housing 10. The front end in this case is configured as a hermaphroditic or genderless connector, with complimentary chin 15 and U-shaped hood 17 structure able to be connected to another identical connector that is rotated 180 degrees, so that the contact surfaces engage properly. The opposing offset chins 15 align during connecting to enclose the engaged contacts 32 and the U-shaped hoods 17 on each of the mating connectors act to longitudinally and rotationally align and accept the opposing connector chin 15 in a straight-in connecting motion. The U-shaped hood restricts this type connector to only a straight-in connecting motion.

Referring again to FIG. 1A, leaf spring 16 is retained by spring base extensions 18 held in two opposing spring pockets or slots 20 (only one shown) proximate and parallel to floor 24. Spring slots 20 are clearly configured to be open to or accessible from the backend opening 12 for spring insertion. The leaf spring 16 is inserted through back end opening 12 so that extensions 18 slide into slots 20. The spring is retained in its final position in slots 20 by spring stake 26, driven upward by external pressure through floor 24, just aft of the base of the spring. The stake 26 is cold formed into the floor 24 of the housing 10 after the leaf spring 16 is inserted into the housing 10. The leaf spring 16 is therefore locked into position because the front edges of the extensions 18 are limited from moving past a front edge of the slots 20, and the rear edge of the leaf spring 16 is limited from moving by the stake 26. The leaf spring 16's cantilevered forward end extends past the barrier wall 22 and is biased upwards away from floor 24.

Referring to FIG. 1B for the description of assembly; contact 30 comprises a front end wiping surface 32, terminated by spring hook 34, and a back end conductor receiver 36. (The conductor is not shown.) Contact 30 is installed by being inserted into backend opening 12 so that the front end wiping surface 32 passed under barrier wall 22, riding along on upwardly biased leaf spring 16 until spring hook 34 latches or snaps over the forward edge or end of the leaf spring 16. The housing is dimensionally configured so that the forward end of conductor receiver 36 abuts barrier wall 22 at this point, whereby contact 30 is locked in its position, restrained from further forward or aft motion and limited to only vertical motion by compression of leaf spring 16.

Thereafter in operation, floating action provided by spring 16 enables contact 30 to be depressed sufficiently during mating with another opposing connector to accept the slight vertical displacement caused by the wiping motion that brings the two opposing contacts into a compressive engagement of their respective wiping surfaces 32 through which electrical current is passed.

However, as discussed above, misuse of electrical connectors or damage to electrical connectors can cause the connectors to fail and/or cause damage to whatever the electrical connectors are electrically joining together. The connectors shown in and described with respect to FIGS. 1A and 1B have no mechanism for measuring or determining when conditions for failure or potential damage to other devices are present. Accordingly, disclosed herein are various connector housings that are configured to enclose a circuit board, and may have other components in the electrical connector for monitoring the state of the connector (e.g., temperature, voltage, current, etc.). Additionally, methods for assembling such connectors are disclosed herein.

Figure 2:
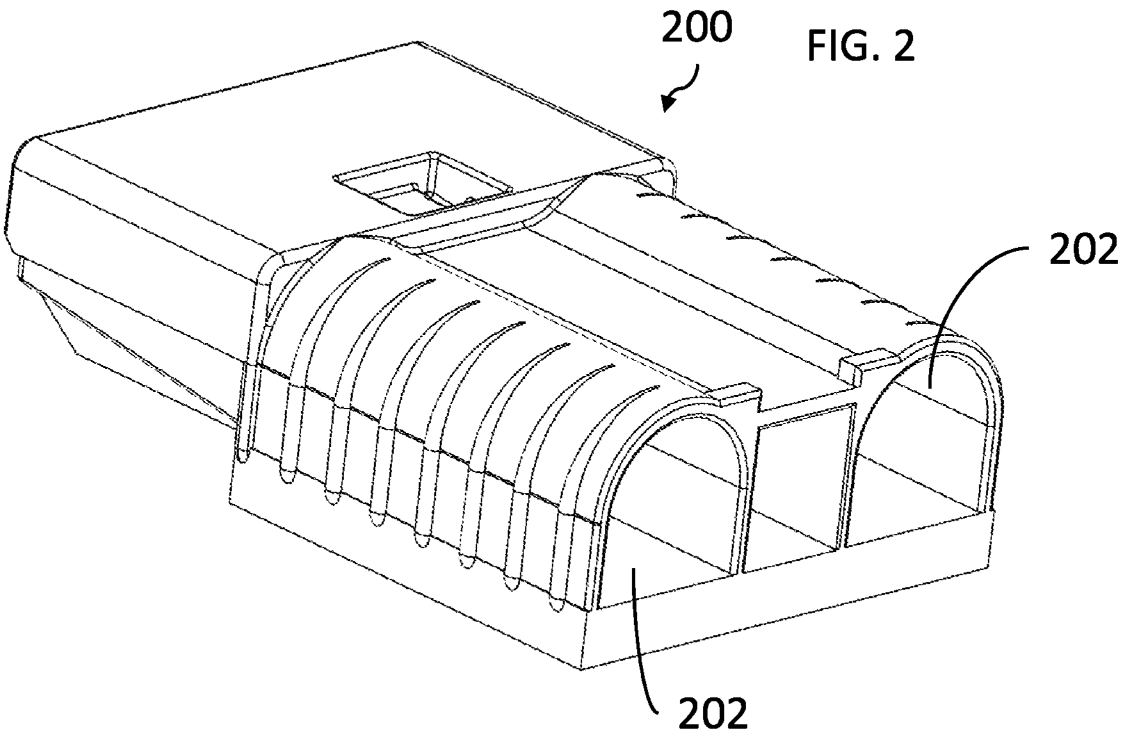
FIG. 2 is a top-right perspective view of an example electrical connector housing in accordance with the teachings of the present disclosure.

FIG. 2 is a top-right perspective view of an example electrical connector housing 200 in accordance with the teachings of the present disclosure. The connector housing 200 includes backend opening 202 into which an electrical contact (not shown in FIG. 2) may be inserted. The example connector housing 200 is a flat-wiping connector, but the various systems and methods described herein may be used with other types of connectors than flat-wiping connectors.

Figure 3:
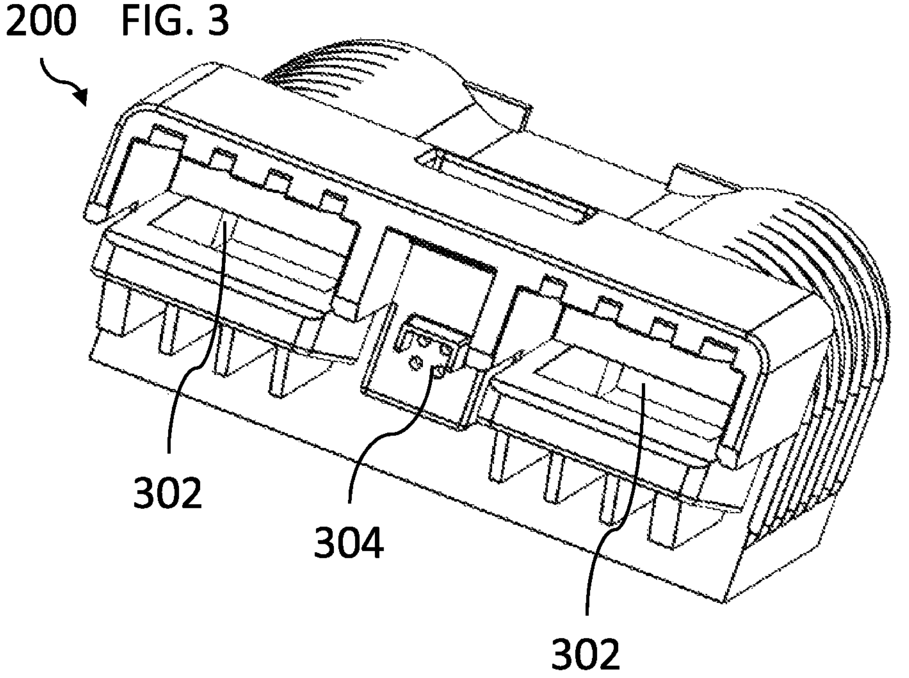
FIG. 3 is a top-left perspective view of the electrical connector housing of FIG. 2 in accordance with the teachings of the present disclosure.

FIG. 3 is a top-left perspective view of the electrical connector housing 200 of FIG. 2 in accordance with the teachings of the present disclosure. In FIG. 3, frontend openings 302 are shown, which are configured to mate with another connector, so that a load may be connected to a power source, for example. The connector housing 200 also includes holes 304. The holes 304 are configured to receive pins that are directly connected to a circuit board enclosed within the connector housing 200. In this way, the pins extending out of the holes 304 may serve as a male connector for joining the circuit board within the connector housing 200 to circuitry of an opposing connector mated to the connector housing 200. In another embodiment, the holes 304 may receive pins that are a part of a connector mated to the connector housing 200. In this way, the holes 304 may serve as a female side connector for the electrically joining the circuit board within the connector housing 200 to circuitry in an opposing connector. In any case, the holes 304 may accommodate electrical connection to a circuit board within the connector housing.

Figure 4:
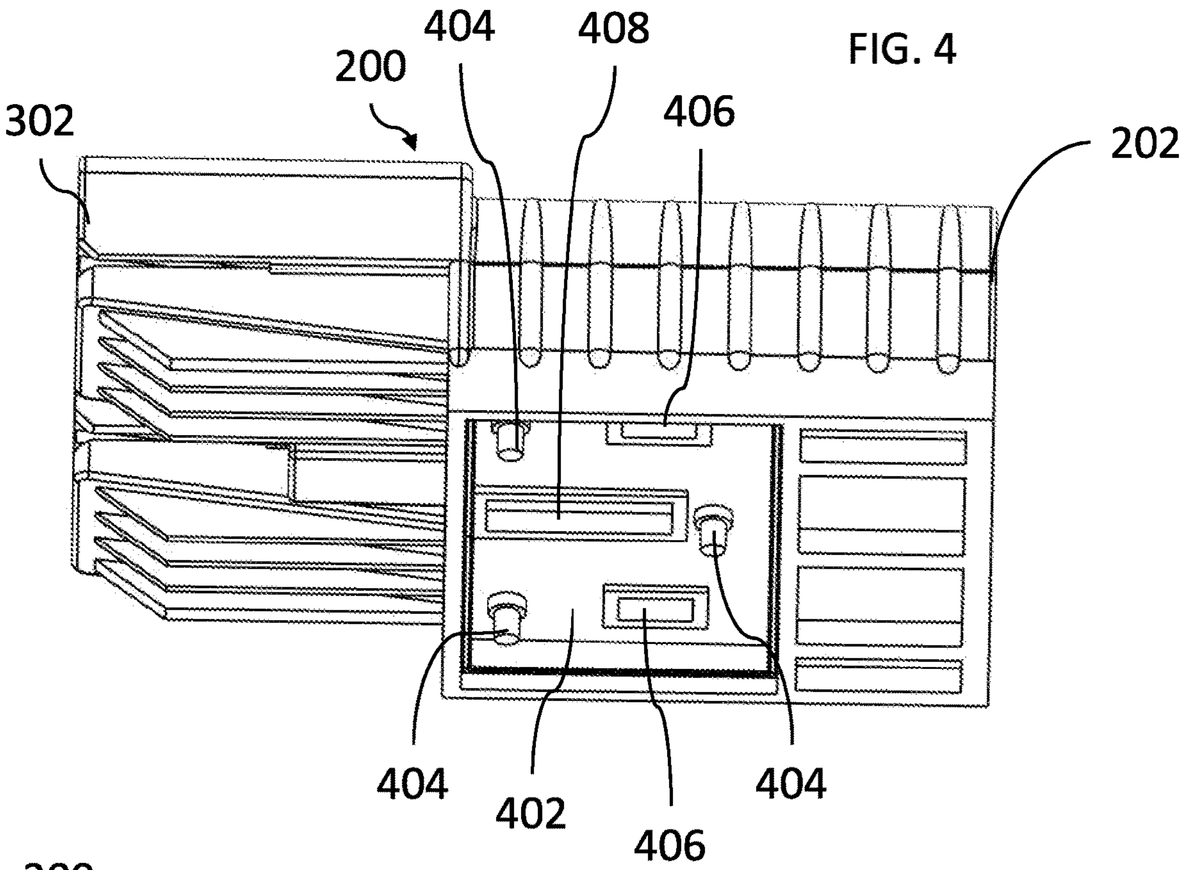
FIG. 4 is a bottom-front perspective view of the electrical connector housing of FIG. 2 in accordance with the teachings of the present disclosure.

FIG. 4 is a bottom-front perspective view of the electrical connector housing 200 of FIG. 2 in accordance with the teachings of the present disclosure. The view of the connector housing 200 shows a chamber 402 in the bottom of the connector housing 200 in which a circuit board may be mounted or otherwise placed. Such a circuit board is not shown in FIG. 4 but is shown in and discussed further with respect to FIGS. 12-14, 17, and 19. Further shown in FIG. 4 are posts 404 molded into the connector housing 200 that may be used for mounting a circuit board to the connector housing 200. In various embodiments, a circuit board may be affixed to or secured into the connector housing 200 using methods or components other than the posts 404 or in addition to the posts 404.

The connector housing 200 also includes passthroughs 406 for electrical leads to pass from the chamber 402 into a second chamber or passageway of the connector housing 200. In this way, an electrical lead may connect a circuit board in the chamber 402 to electrically conductive components, sensors, etc. other portions of chambers of the connector housing 200. In addition, a passthrough 408 provides an opening for electrical leads or pins to connect a circuit board within the chamber 402 to the holes 304 of FIG. 3 so that the circuit board may electrically connect to something outside of the connector housing 200. In various embodiments, additional, different, or fewer passthroughs than the passthroughs 406 and 408 may be used to connect a chamber for a circuit board with another chamber or passageway of a connector housing. In various embodiments, any passthroughs in the connector housing 200 may also be sealed after electrical components are inserted therethrough to separate or seal a chamber for a circuit board and other chamber(s) of the electrical connector.

Figure 5:
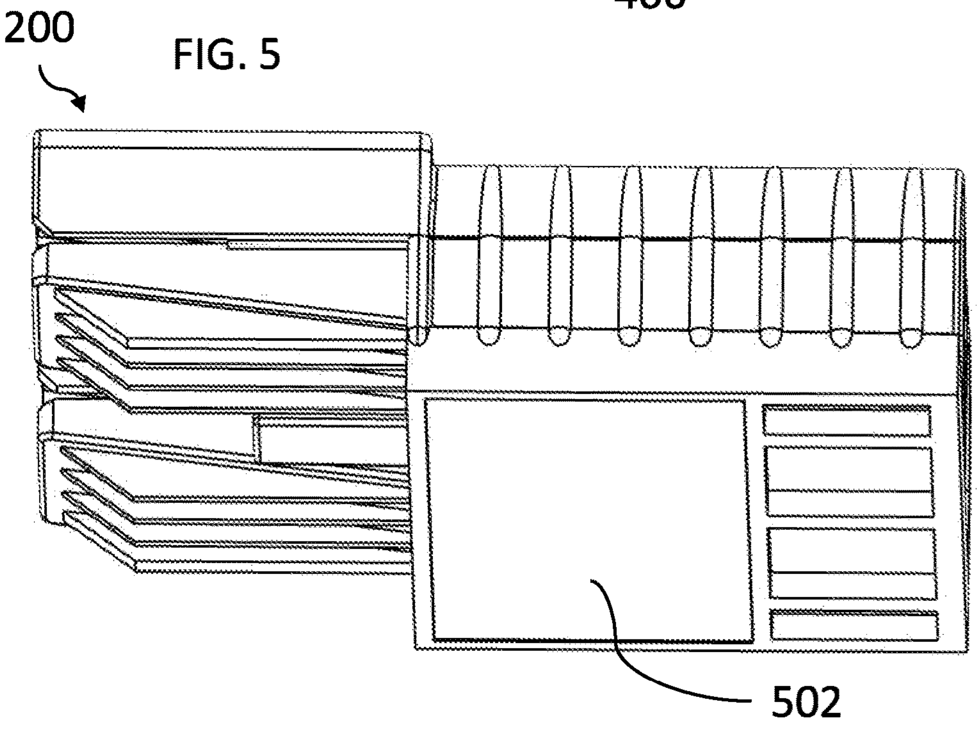
FIG. 5 is a bottom-front perspective view of the electrical connector housing of FIG. 2 with a bottom cover in accordance with the teachings of the present disclosure.

FIG. 5 is a bottom-front perspective view of the electrical connector housing 500 of FIG. 2 with a bottom cover in accordance with the teachings of the present disclosure. The connector housing 500 shown in FIG. 5 includes a bottom cover 502 placed over the chamber 402 shown in FIG. 4. The bottom cover 502 may be affixed, sealed, or otherwise connected to the connector housing 200 to protect the circuit board and any other components in the chamber 402.

FIG. 6 is a front elevational view of the electrical connector housing 200 of FIG. 2 in accordance with the teachings of the present disclosure. FIG. 7 is a rear elevational view of the electrical connector housing 200 of FIG. 2 in accordance with the teachings of the present disclosure.

Figure 8:
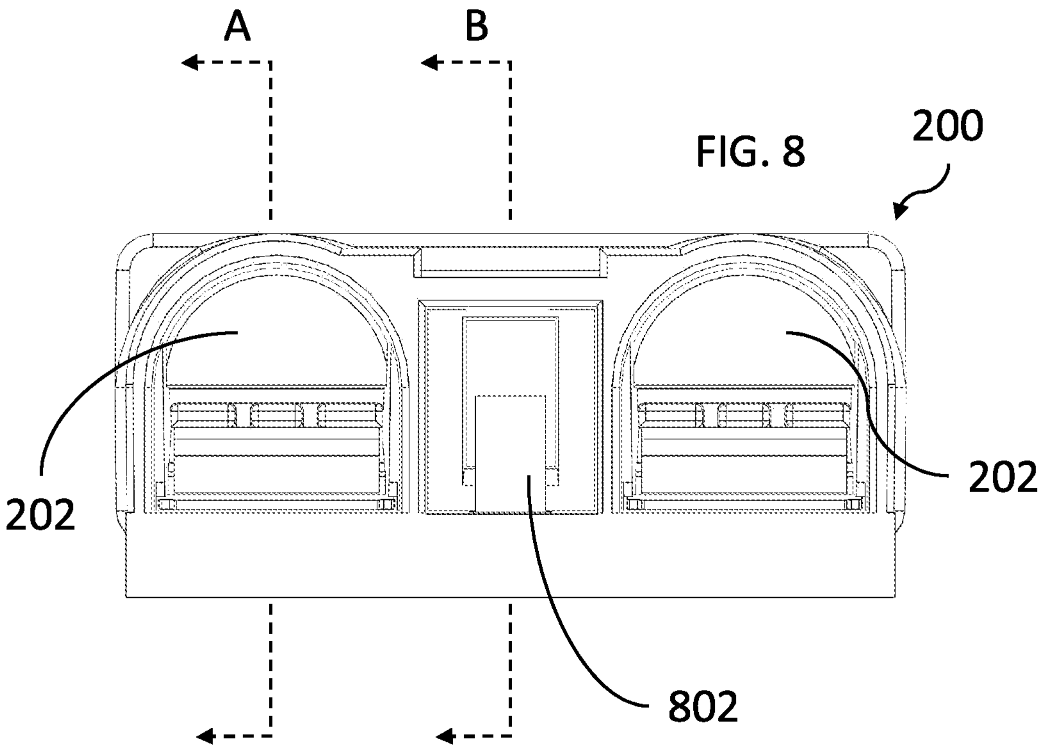
FIG. 8 is a right side elevational view of the electrical connector housing of FIG. 2 in accordance with the teachings of the present disclosure.
Figure 9:
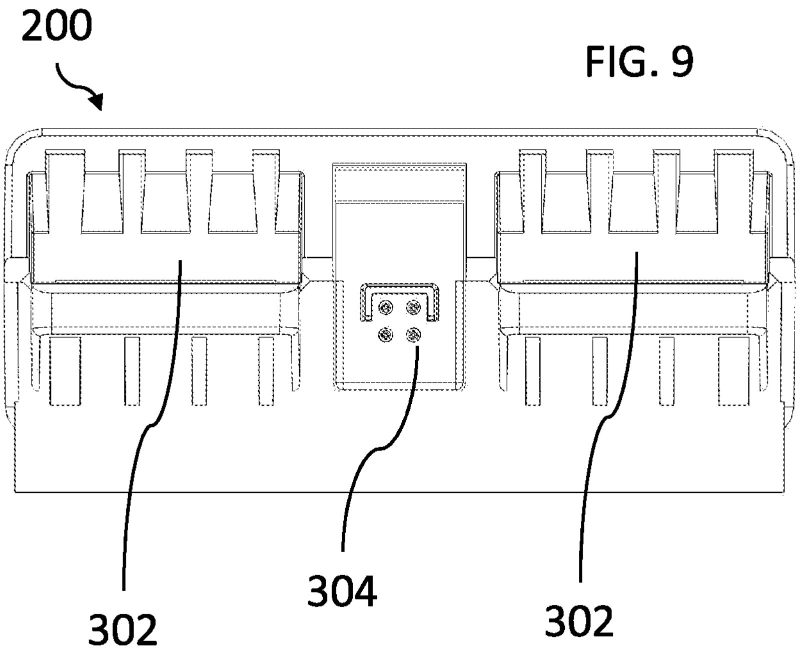
FIG. 9 is a left side elevational view of the electrical connector housing of FIG. 2 in accordance with the teachings of the present disclosure.
Figure 10:
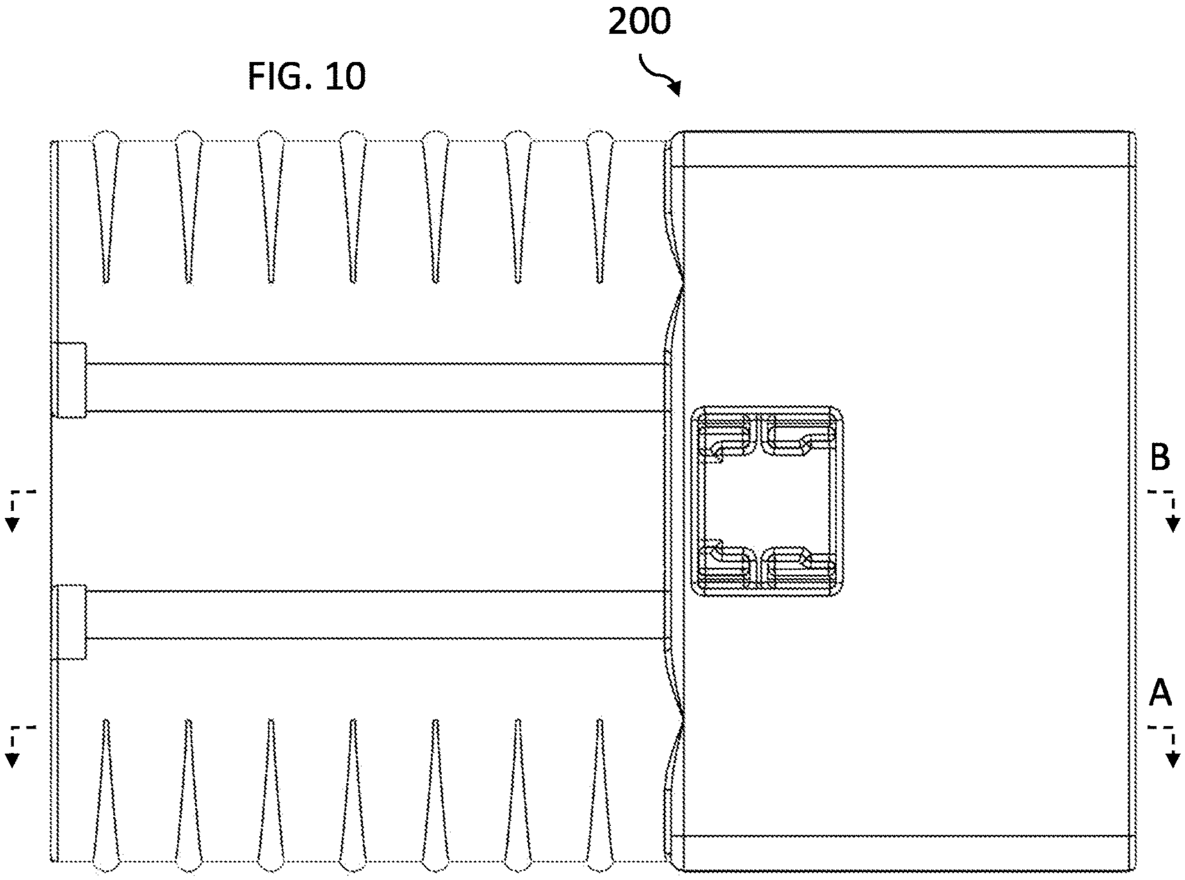
FIG. 10 is a top plan view of the electrical connector housing of FIG. 2 in accordance with the teachings of the present disclosure.
Figure 16:
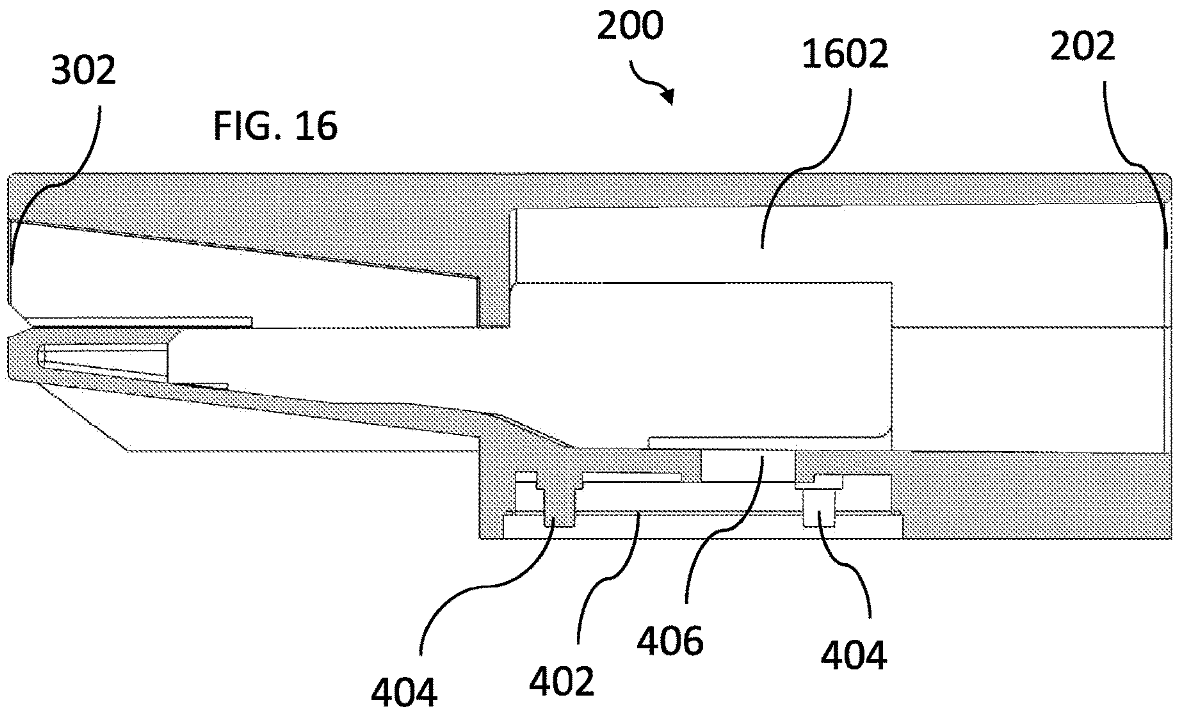
FIG. 16 is a cross-sectional front view of the electrical connector housing of FIG. 2 taken along the cross-sectional line A shown in FIGS. 8 and 10 in accordance with the teachings of the present disclosure.
Figure 18:
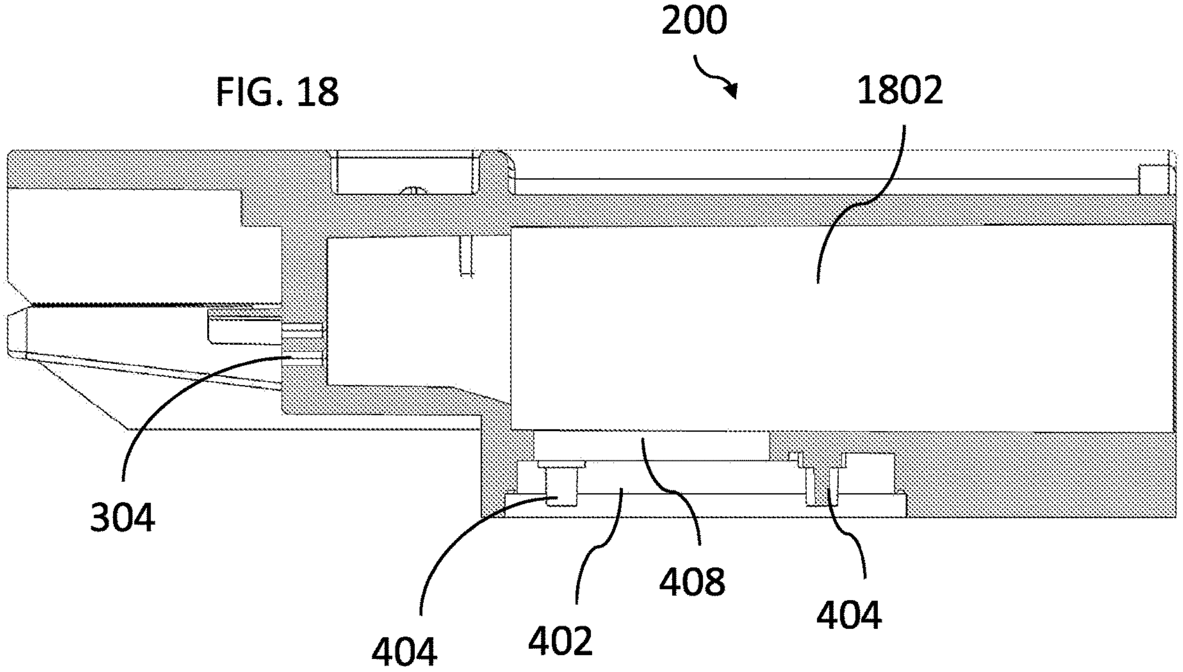
FIG. 18 is a cross-sectional front view of the electrical connector housing of FIG. 2 taken along the cross-sectional line B shown in FIGS. 8 and 10 in accordance with the teachings of the present disclosure.

FIG. 8 is a right side elevational view of the electrical connector housing 200 of FIG. 2 in accordance with the teachings of the present disclosure. FIG. 9 is a left side elevational view of the electrical connector housing 200 of FIG. 2 in accordance with the teachings of the present disclosure. The connector housing 200 as shown in FIG. 8 includes a pin cover 802 that may cover and protect pins that are running from a circuit board in the connector housing 200 to the holes 304 of the connector housing 200. In some embodiments, the pin cover 802 may not be present in the connector housing 200 itself, but may be mounted on or otherwise be a part of a circuit board in the connector housing 200. In addition, FIG. 8 shows cross-sectional lines A and B. Cross-sectional views of the connector housing 200 associated with the cross-sectional lines A and B are shown in FIGS. 16 and 18, respectively. FIG. 10 is a top plan view of the electrical connector housing 200 of FIG. 2 in accordance with the teachings of the present disclosure. FIG. 10 also shows the cross-sectional lines A and B that are depicted in FIGS. 16 and 18, respectively.

Figure 11A:
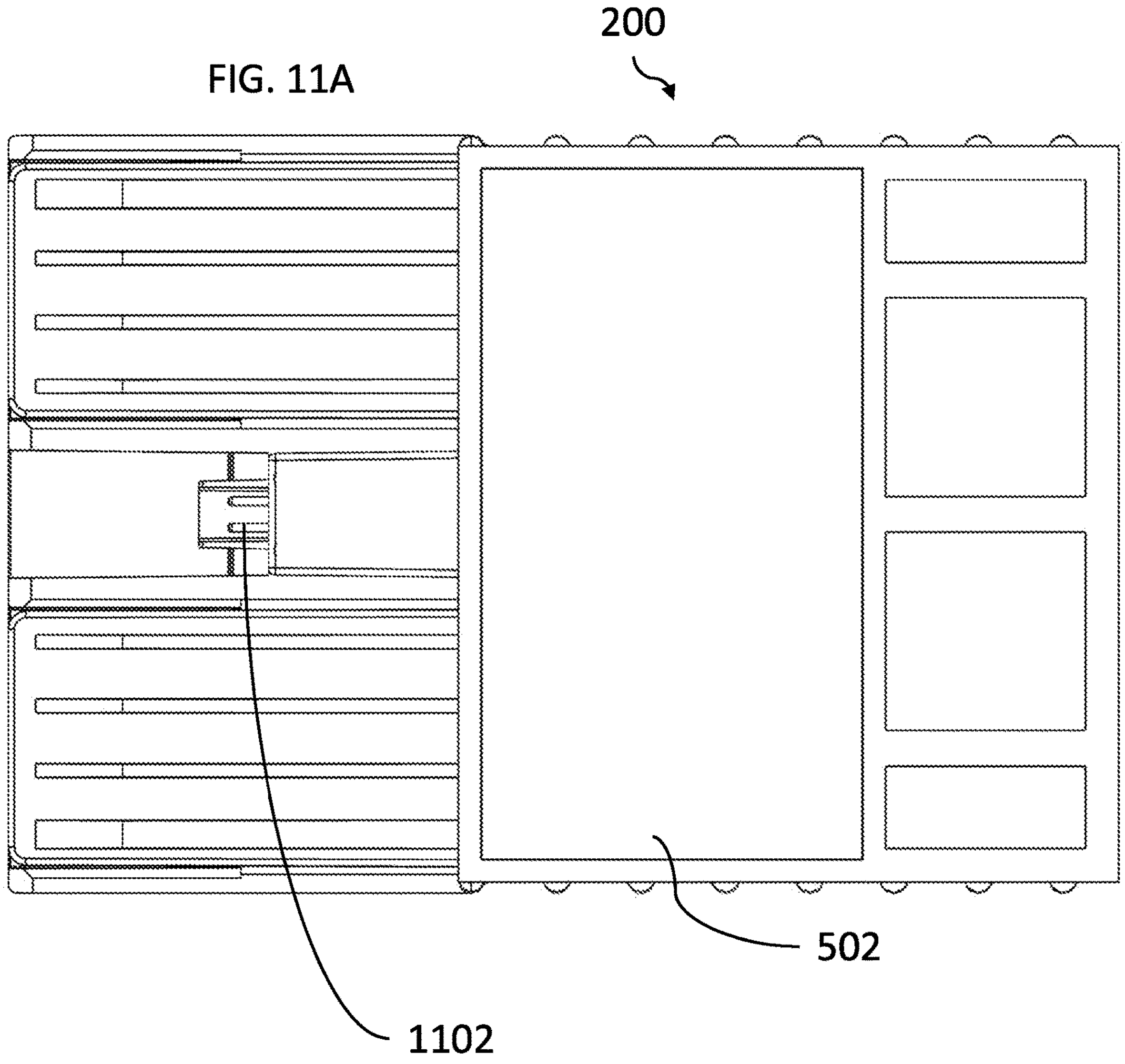
FIG. 11A is a bottom plan view of the electrical connector housing of FIG. 2 with a bottom cover in accordance with the teachings of the present disclosure.
Figure 11B:
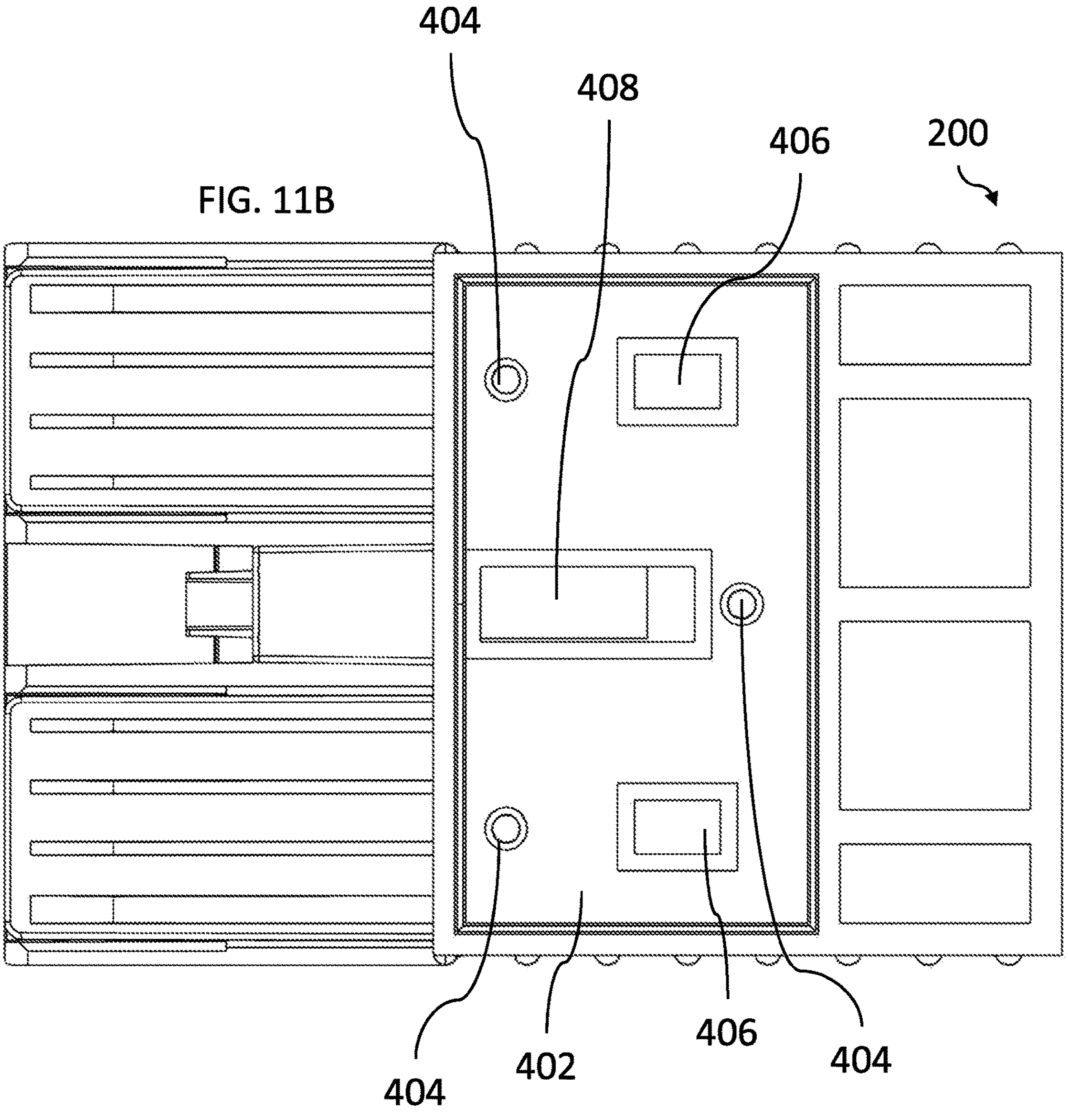
FIG. 11B is a bottom plan view of the electrical connector housing of FIG. 2 in accordance with the teachings of the present disclosure.

FIG. 11A is a bottom plan view of the electrical connector housing 200 of FIG. 2 with the bottom cover 502 in accordance with the teachings of the present disclosure. FIG. 11B is a bottom plan view of the electrical connector housing 200 without the bottom cover 502 of FIG. 2 in accordance with the teachings of the present disclosure. Also shown in FIG. 11A are pins 1102 that may pass through the holes 304 as described herein, which are not shown in FIG. 11B. Like FIG. 4, FIG. 11B without the bottom cover 502 shows the chamber 402 configured to house a circuit board, the posts 404 for mounting a circuit board, the passthroughs 406 for connecting a circuit board to components inside other passageways or chambers of the connector housing 200, and the passthrough 408 for pins to connect a circuit board to another device or connector.

Figure 12:
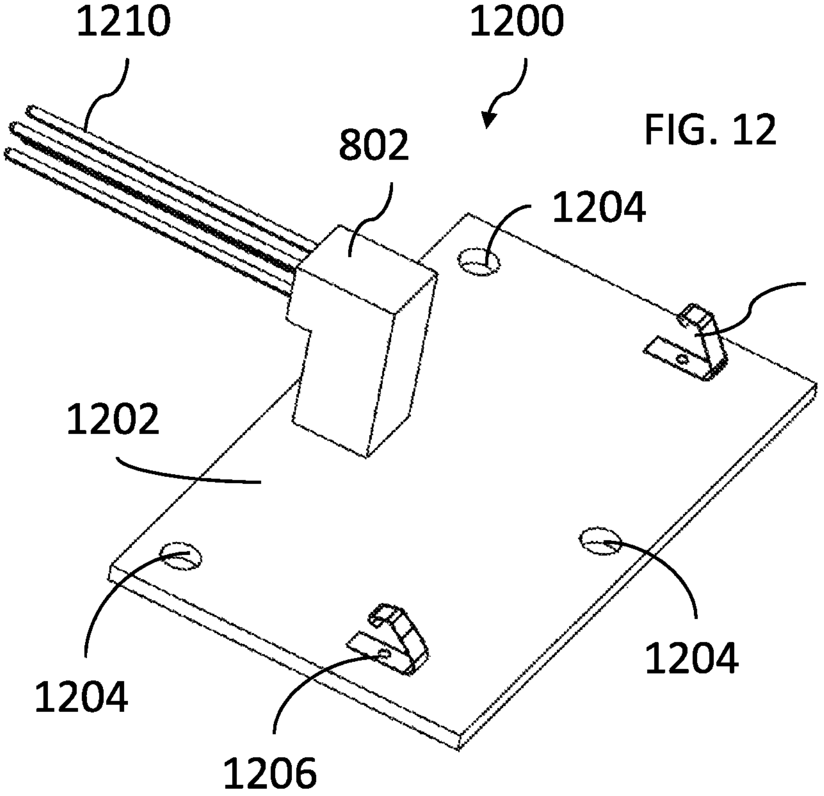
FIG. 12 is a top-right perspective view of an example circuit board assembly in accordance with the teachings of the present disclosure.
Figure 13:
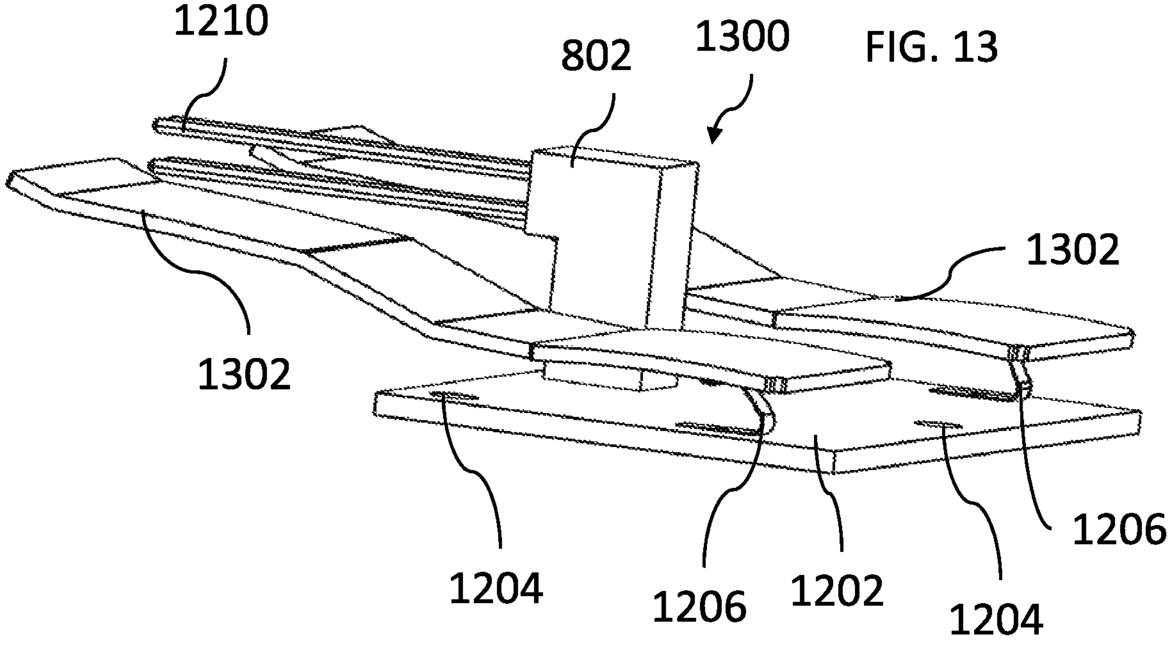
FIG. 13 is a front-right perspective view of the circuit board assembly of FIG. 12 and two example retainer springs in accordance with the teachings of the present disclosure.

FIG. 12 is a top-right perspective view of an example circuit board assembly 1200 in accordance with the teachings of the present disclosure. FIG. 13 is a front-right perspective view of the circuit board assembly 1200 of FIG. 12 and two example retainer springs 1302 in accordance with the teachings of the present disclosure. The components of the circuit board assembly 1200 may be assembled and connected before insertion into an electrical connector housing such as the connector housing 200 disclosed herein. The circuit board assembly 1200 includes a circuit board 1202 (circuitry not shown), and the circuit board 1202 has holes 1204 to accommodate the posts 404 shown in FIGS. 4 and 11B. The holes 1204 may fit over the posts 404, and the circuit board 1202 may fit to the posts 404 in various ways. For example, the posts 404 may be heat staked to slightly melt around and secure the circuit board 1202 within the chamber 402. In other examples, adhesive may be used to attach the circuit board 1202 to the posts 404, an interference fit between the circuit board 1202 and the posts 404 may be used to attach the circuit board 1202 to the posts 404, or any other suitable method of securing the circuit board 1202 within a chamber of the connector housing may be used in various embodiments.

The circuit board assembly 1200 further includes electrical leads 1206 attached to the circuit board. The electrical leads 1206 may be shaped such that, when they are in contact with the retainer springs 1302, the electrical leads 1206 have a spring force that pushes back on the retainer springs 1302 to maintain an electrical connection between the retainer springs 1302 and the circuit board 1204. In addition, the electrical leads 1206 are shaped such that during insertion of the retainer springs 1302 into a connector housing such as the connector housing 200 will slide along the electrical leads 1206 without catching on the electrical leads 1206. FIGS. 12 and 13 demonstrate just one possible way of electrically connecting the circuit board 1202 to the retainer springs 1302, but any other ways of connecting the two may be used in various embodiments. In addition, though the embodiments of FIG. 13 relates to connecting the circuit board 1202 to the retainer springs 1302, similar or different electrical leads may electrically connect the circuit board 1202 directly or indirectly to other components within a connector body, such as an electrical contact, a sensor, or any other component. The circuit board assembly further includes the pin cover 802 that covers pins 1210 that electrically connect the circuit board 1202 to a device or connector external to the connector in which the circuit board 1202 is enclosed.

Figure 14:
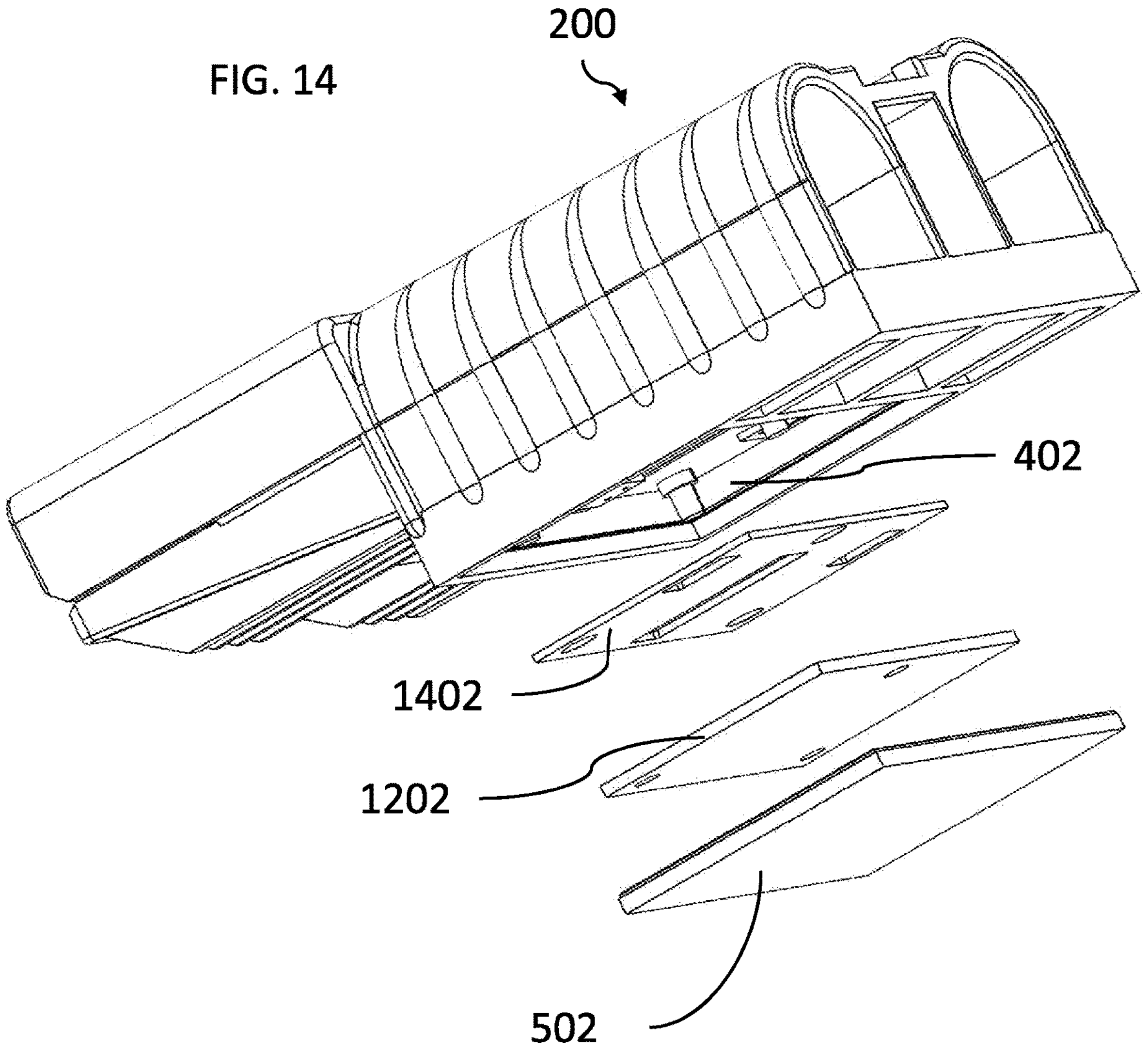
FIG. 14 is an exploded perspective view of the electrical connector housing of FIG. 2, an example gasket, an example circuit board, and an example bottom cover in accordance with the teachings of the present disclosure.

FIG. 14 is an exploded perspective view of the electrical connector housing 200 of FIG. 2, an example gasket 1402, the circuit board 1202, and the bottom cover 502 in accordance with the teachings of the present disclosure. In particular, FIG. 14 shows how the gasket 1402 may be placed between the circuit board 1202 and a surface of the chamber 402 into which the circuit board 1202 is mounted. The gasket 1402 may include holes to accommodate the posts 404 that are used to mount circuit board 1202, as well as openings that align with the passthroughs 406 and 408 to allow connections from the circuit board 1202 to devices, sensors, components, etc. within the connector housing 200. The gasket 1402 further serves to seal the circuit board 1202 and components thereof from the rest of the connector housing 200, including around the passthroughs 406 and 408.

Figure 15:
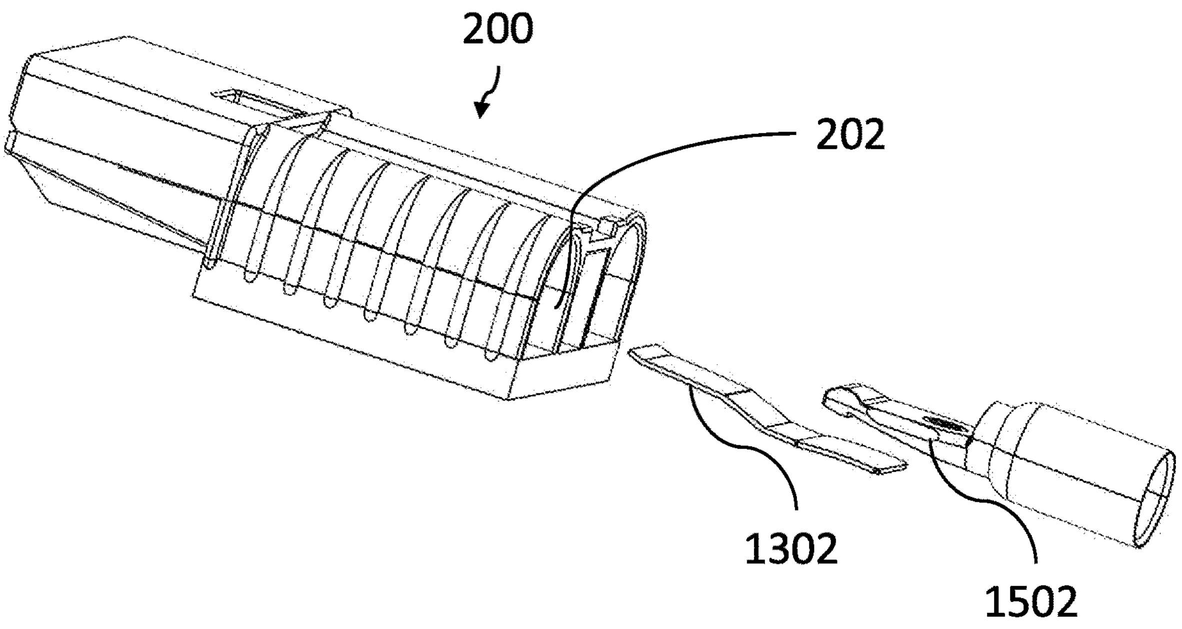
FIG. 15 is an exploded perspective view of the electrical connector housing of FIG. 2, a retainer spring, and an electrical contact in accordance with the teachings of the present disclosure.

FIG. 15 is an exploded perspective view of the electrical connector housing 200 of FIG. 2, the retainer spring 1302, and an electrical contact 1502 in accordance with the teachings of the present disclosure. When using the electrical connector 202, the retainer spring 1302 is first inserted into the backend opening 202. The retainer spring 1302 is secured into the connector housing 200 after insertion. A wire may be inserted into an opening of the electrical contact 1502 and the electrical contact is crimped around the wire. The electrical contact 1502 may then be inserted into the backend opening 202, and upon full insertion, the electrical contact 1502 is retained within the connector housing 200 by the retainer spring 1302.

FIG. 16 is a cross-sectional front view of the electrical connector housing 200 of FIG. 2 taken along the cross-sectional line A shown in FIGS. 8 and 10 in accordance with the teachings of the present disclosure. The example of FIG. 16 shows the connector housing 200 without a circuit board, gasket, bottom cover, retainer spring, or electrical contact installed therein. The connector housing 200 includes the backend opening 202 through which a retainer spring and an electrical contact may be inserted as disclosed herein. The connector housing 200 further includes the frontend opening 302, which may mate with another connector housing similar to the connector housing 200 as disclosed herein, in order to cause an electrical contact in the two connector housings to also mate. FIG. 16 further shows the chamber 402 in which a circuit board may be mounted and a chamber 1602 in which an electrical contact may be inserted. The passthrough 406 (as well as the passthrough 408 and another passthrough 406, which are not shown in FIG. 16) connects the chamber 402 and the chamber 1602, so that electrical leads (e.g., the electrical leads 1206) or other components may extend from a circuit board in the chamber 402 into the chamber 1602. FIG. 16 further shows the posts 404 which may be used to mount or secure a circuit board within the chamber 402.

Figure 17:
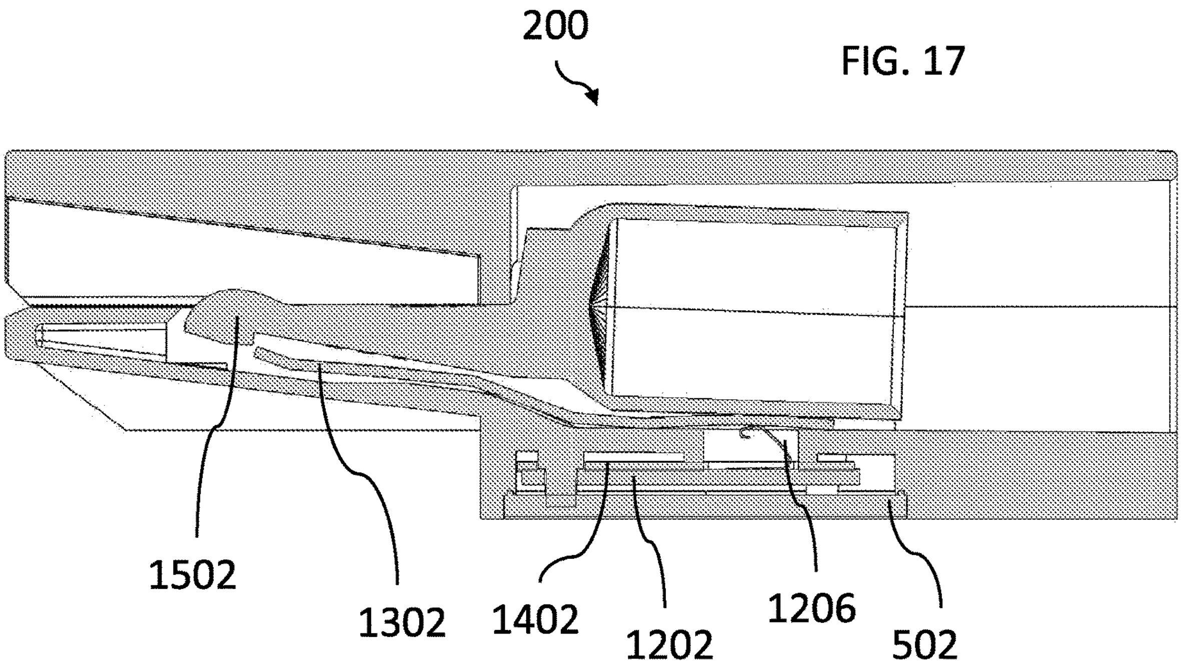
FIG. 17 is a cross-sectional front view of an electrical connector assembly taken along the cross-sectional line A shown in FIGS. 8 and 10 in accordance with the teachings of the present disclosure.

FIG. 17 is a cross-sectional front view of an electrical connector assembly taken along the cross-sectional line A shown in FIGS. 8 and 10 in accordance with the teachings of the present disclosure. In particular, FIG. 17 shows an assembly with the retainer spring 1302, the electrical contact 1502, the gasket 1402, the circuit board 1202, the electrical lead 1206, and the bottom cover 502 all in place. As shown in FIG. 17, the electrical lead 1206 may extend from the circuit board 1202 to the retainer spring 1302. The electrical lead 1206, the retainer spring 1302, and the electrical contact 1502 may all be formed from electrically conductive material, such as an electrically conductive metal. In this way, components on the circuit board 1202 may be able to detect aspects of electricity or electrical signals in the electrical contact 1502 and a wire within the electrical contact 1502. For example, a voltage of the electrical contact 1502 and the retainer spring 1302 may be sensed. In the embodiment of FIG. 17, only a single electrical lead 1206 contacts the retainer spring 1302. However, in other embodiments, a connector housing may be configured to provide multiple passthroughs such that multiple electrical leads may be in contact with a retainer spring and/or electrical contact. In this way, other aspects of signals passing through the electrical contact 1502 may be measured, such as current passing through the electrical contact 1502.

FIG. 18 is a cross-sectional front view of the electrical connector housing 200 of FIG. 2 taken along the cross-sectional line B shown in FIGS. 8 and 10 in accordance with the teachings of the present disclosure. FIG. 18 specifically shows the passthrough 408 that connects the chamber 402 for a circuit board to a chamber 1802. The chamber 1802 is separate from the chamber 1602, to isolate an electrical contact in the chamber 1602 from the chamber 1802 and another chamber in which a second electrical contact is inserted. The holes 304 provide an opening for pins to pass from inside the connector housing 200 (e.g., the chamber 1802) to outside of the connector housing 200.

Figure 19:
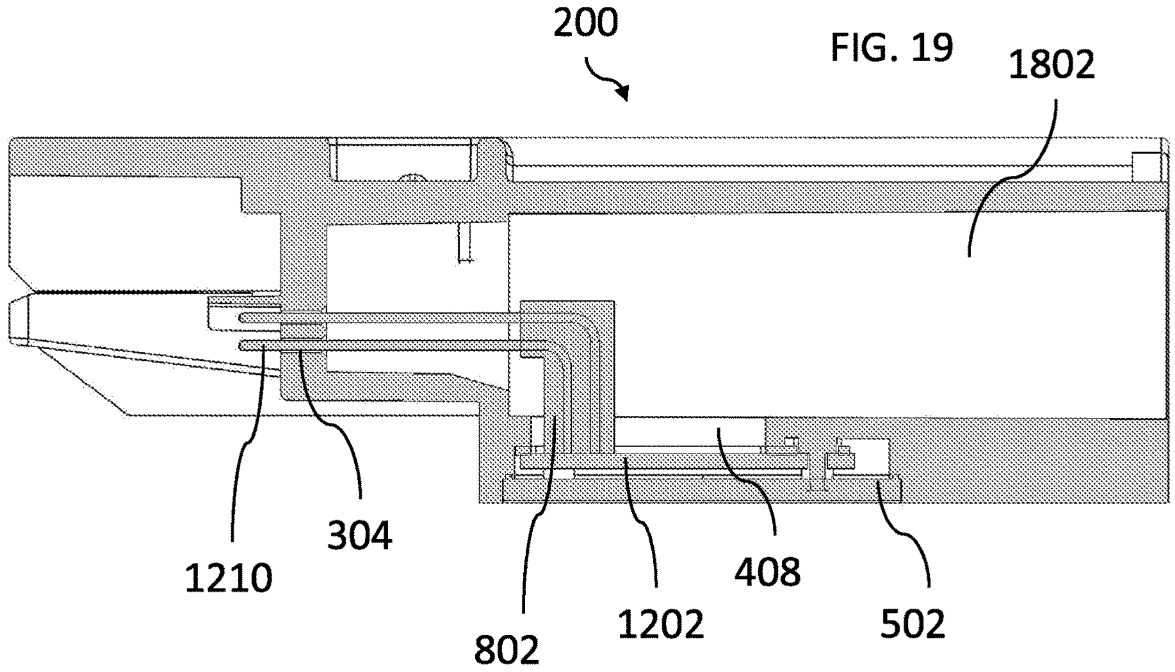
FIG. 19 is a cross-sectional front view of an electrical connector assembly taken along the cross-sectional line B shown in FIGS. 8 and 10 in accordance with the teachings of the present disclosure.

FIG. 19 is a cross-sectional front view of an electrical connector assembly taken along the cross-sectional line B shown in FIGS. 8 and 10 in accordance with the teachings of the present disclosure. FIG. 19 shows how the pins 1210 may pass from the circuit board 1202, through the passthrough 408 to the chamber 1802, and through the holes 304 to an outside of the connector housing 200. In this way, the pins 1210 may, for example, contact another electrical connector to facilitate communication between two electrical connectors. The pins 1210 may be protected in part or in whole within the chamber 1802 by the pin cover 802, which may also extend from the circuit board 1202 through the passthrough 408, and into the chamber 1802.

In various embodiments, the circuit board 1202 may include or may be connected to various components for measuring conditions of an electrical connector, contacts within the electrical connector, air/environment within or outside the electrical connector, or any other aspect of the electrical connector or related to the electrical connector. For example, a temperature sensor may be located on the circuit board 1202 or anywhere within the connector housing 200. For example, a temperature sensor may be located within the chamber 402, within the chamber 1602, within the chamber 1802, or anywhere on an external surface of the connector housing 200. Additionally or alternatively, temperature sensors may be located to be in contact with one or more of the electrical leads 1206, the retainer spring 1302, the electrical contact 1502, the pins 1210, and/or any other component within the connector housing 200. In various embodiments, other types of sensors may also be incorporated into any location within or on the connector housing 200 or on components within the connector housing 200. For example, moisture or humidity sensors or any other type of sensors may be used to monitor a condition of and/or environment of a connector housing. Any various sensors incorporated into the connector housing 200 may also include electrical leads that run from a sensor to the circuit board 1202 so that measurements from those sensors may be detected/received. Electrical leads may run from said sensors through one of the passthroughs 406 or 408 disclosed herein, or may run through a different passthrough.

Figure 20:
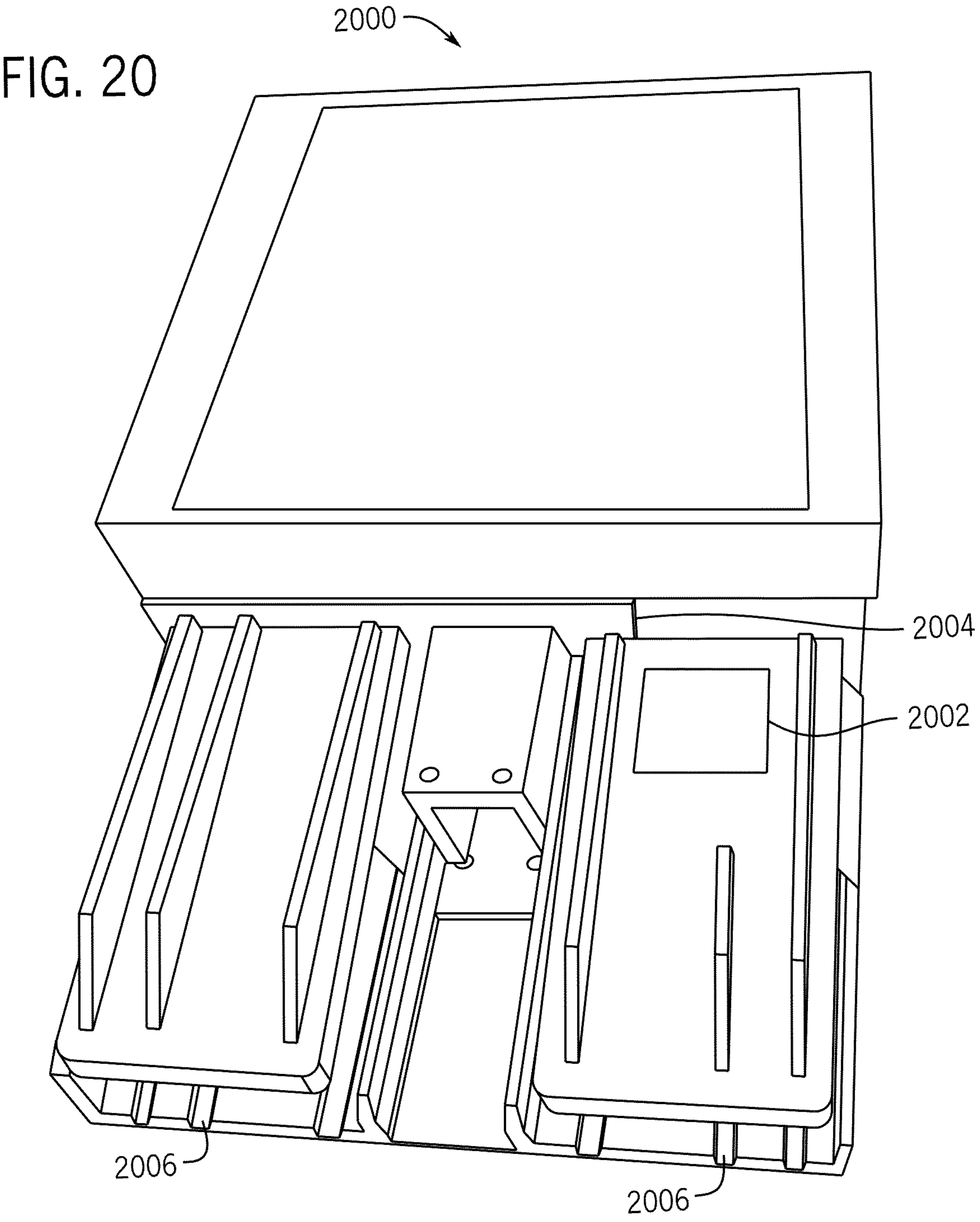
FIG. 20 is a bottom-left perspective view of another example electrical connector housing in accordance with the teachings of the present disclosure.

FIG. 20 is a bottom-left perspective view of another example electrical connector housing 2000 in accordance with the teachings of the present disclosure. The connector housing 2000 includes a passthrough 2004 that connects a chamber for a circuit board to an outside of the connector housing 2000. Frontend openings 2006 are also shown in the connector housing 2000. Electrical leads for connecting a radio frequency identification (RFID) reader 2002 extend into the passthrough 2004 to connect the RFID reader 2002 to a circuit board within the connector housing 2000. The RFID reader 2002 is placed on an external portion of the connector housing 2000 that overlaps with another connector housing when two electrical connectors are mated. In this way, the RFID reader 2002 may read an RFID tag on another electrical connector. Therefore, the unique identifier read from another RFID tag may be identified. That unique identifier may be associated with the other electrical connector not shown, a battery charger to which the other electrical connector is connected, a battery to which the other electrical connector is connected, or any other device associated with the other electrical connector. In this way, a processor of the circuit board or another computing device with which the processor of the circuit board is in communication with may identify what device or connector the connector housing 2000 is connected to. In another embodiment, the connector housing 2000 may have an RFID tag instead of the RFID reader 2002 or may have both an RFID tag and an RFID reader 2002. By placing either an RFID tag or an RFID reader on the portion of the connector housing 2000 that overlaps with another connector, the RFID reader on one connector may overlap with the RFID tag on the other connector to read the tag. Although the RFID reader is shown mounted on a surface of the connector housing, an RFID reader or tag could also be formed within a portion of a connector housing in various embodiments.

Figure 21:
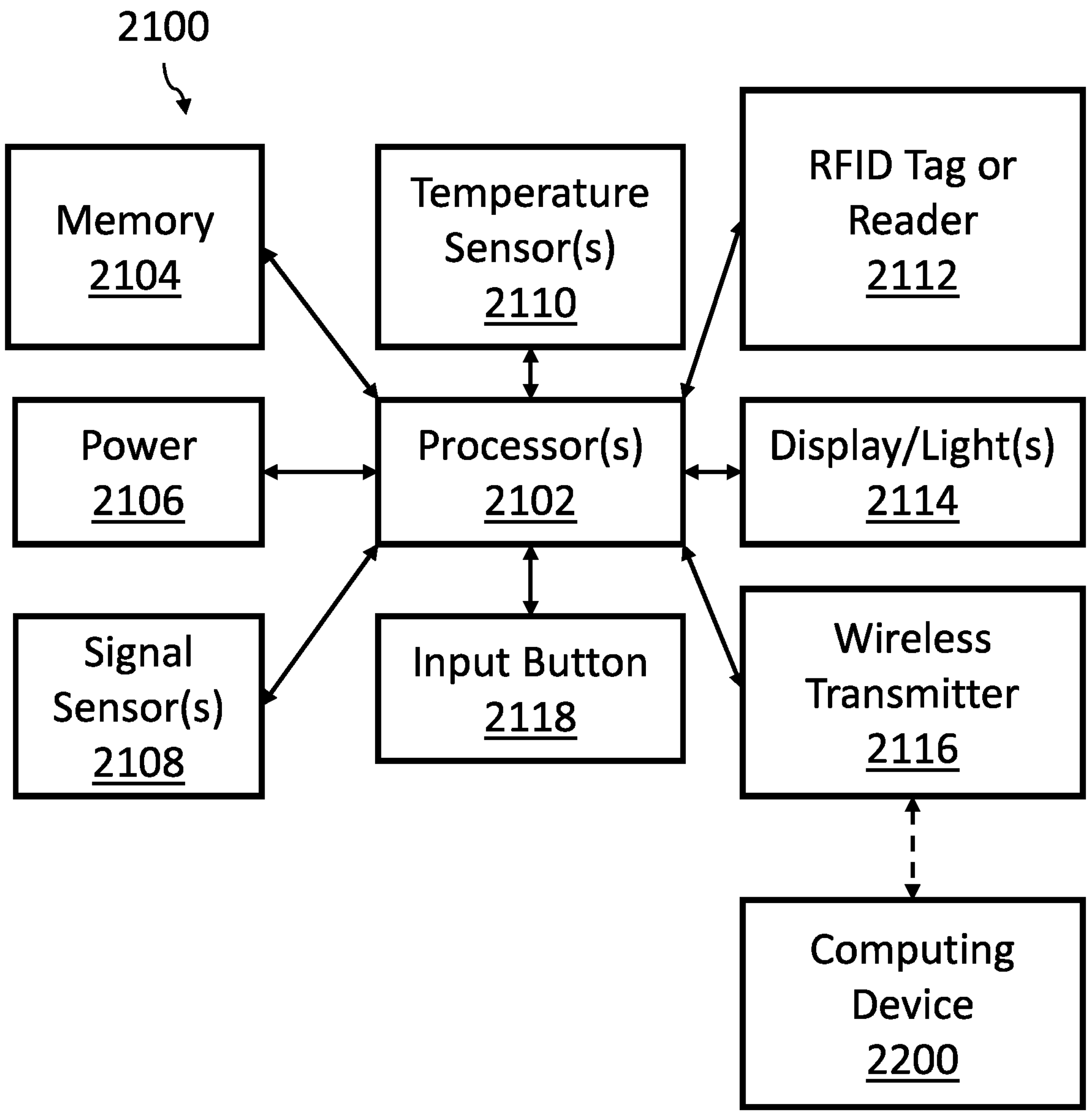
FIG. 21 is a block diagram view of an example system for an example electrical connector with a circuit board enclosed therein in accordance with the teachings of the present disclosure.

FIG. 21 is a block diagram view of an example system 2100 for an example electrical connector with a circuit board enclosed therein in accordance with the teachings of the present disclosure. The various aspects of the system 2100 may be mounted on a circuit board inside of a connector housing as disclosed herein, may be mounted on or in a connector housing and electrically connected to a circuit board inside of a connector housing, or may otherwise be in communication (e.g., wired or wireless) with components of a circuit board inside of a connector housing as disclosed herein.

In particular, a processor 2102 and/or other devices of the system 2100 may be powered by a power source 2106. The power source 2106 may be any type of power source, such as a battery or power pulled from current passing through an electrical contact within the electrical connector housing. The processor 2102 may be operatively coupled to a memory 2104, an input button 2118, one or more temperature sensor(s) 2110, an RFID tag or reader 2112, a display or light(s) 2114, an input button 2118 (or other user interface), and a wireless transmitter 2116. The memory 2104 may have stored thereon code (e.g., non-transient computer readable instructions) is stored and read or executed by the processor 706. Such code may cause the processor 2102 to perform any of the actions, steps, methods, etc. disclosed herein. The memory 2104 may also store various sensor data captured, such as temperature, RFID tags read, voltage or current of signals read, etc., along with timestamps of any information sensed or determined by the components of the system 2100. The processor 2102 may also communicate such data to another computing device 2200 through a wireless transmitter 2116. The system 2100 and/or the computing device 2200 may further have any components of or may be the computing device described below with respect to FIG. 24. In various embodiments, the system 2100 may additionally communicate with the computing device 2200 or other computing devices through a wired connection.

The temperature sensor(s) 2110 may be the temperature sensors disclosed herein that are used to monitor the temperature of various components within a connector housing, air within or outside the connector housing, or at a surface of a connector housing to monitor for a thermal runaway incident or any other temperature behavior or condition that is desirable to monitor for. As described below with respect to FIG. 23, the processor may also transmit an alert to another computing device if a temperature sensed reaches or exceeds a predetermined threshold temperature that indicates a dangerous or undesirable temperature condition associated with an electrical connector housing, such as at a particular location on or in the housing or of a particular component within the housing.

The wireless transmitter 2116 may communicate with the computing device 2200. The computing device 2200 may be communicated with in various embodiments through a wired or wireless (e.g., Bluetooth) connection. The computing device 2200 may be any type of computing device, controller, processor, etc. For example, the computing device 2200 may be smartphone, tablet, laptop, larger output display, specially built computing device for use with the system 2100, a controller of a hydraulic or otherwise automated pipe bender, etc. In this way, the system 2100 may be configured to communicate with any other type of computing device.

Data representative of the sensor measurements (e.g., the temperature sensor(s) 2110, the RFID reader 2112, the signal sensor(s) 2108) may be sent to the computing device 2200 via the wireless transmitter 2116 for display, collection, or any other purpose. In various examples, the wireless transmitter 2116 may also be a transceiver that may receive signals/data from the computing device 2200.

An input button 2118 or other type of user input device may be incorporated into the system 2100, so that a user may provide an input. For example, the input button 2118 may be pressed to indicate to the system 2100 that data stored in the memory 2104 should be transmitted to the computing device 2200. In other embodiments, such transmission of data may occur automatically. A display/light(s) 2114 may provide feedback to a user. For example, a green light emitting diode (LED) may indicate that the temperature of an electrical connector is acceptable, while a yellow or red LED may indicate that there is a problem with a connector or the temperature of the connector.

In various embodiments, additional, different, or fewer aspects than those shown in FIG. 21 may be used. For example, additional sensors of the same type shown in FIG. 21 may be used, different types of sensors than those shown in FIG. 21 may be used, or fewer sensors than those shown in FIG. 21 may be used. Other devices or electronic components such as wireless radios, GPS chips, or any other type of electronic devices or components may be additionally or alternatively used. In addition, as disclosed herein, various electronic components (whether shown in FIG. 21 or not) may communicate with one another through wired or wireless connections, and may each communicate with a separate computing device (e.g., the computing device 2200) through wired or wireless connections in various embodiments.

Figure 22:
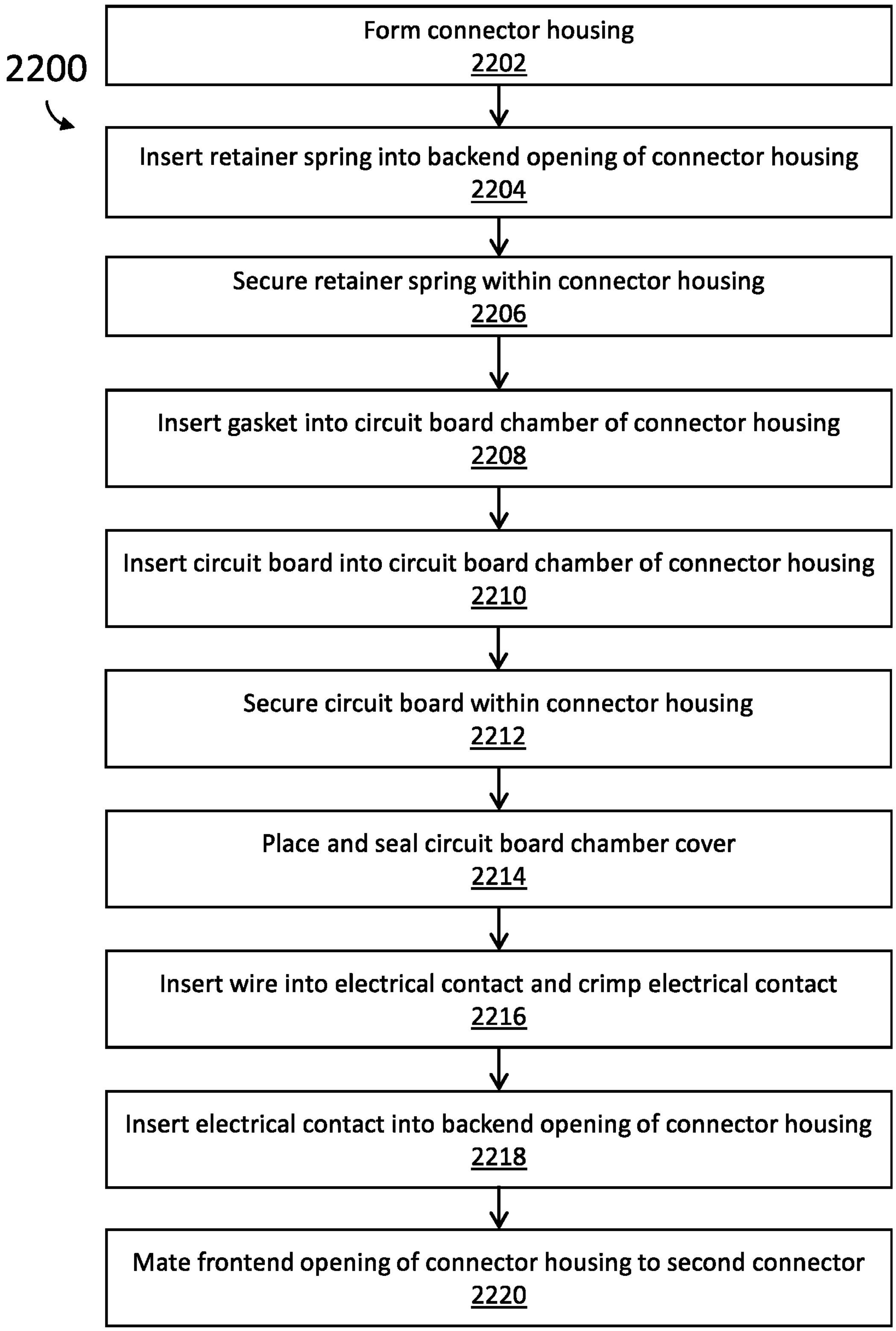
FIG. 22 is a flow chart illustrating an example method for assembling an electrical connector in accordance with the teachings of the present disclosure.

FIG. 22 is a flow chart illustrating an example method 2200 for assembling an electrical connector in accordance with the teachings of the present disclosure. At block 2202, a connector housing is formed, for example, out of a nonconductive plastic. At block 2204, one or more retainer springs may be inserted into one or more backend openings of the connector housing. For example, retainer springs may be the retainer springs 1302 of FIGS. 13, 15, and 17 and the connector housing may be the connector housing 200 disclosed herein.

At block 2206, the one or more retainer springs may be secured within the connector housing. Some retainer springs and connector housing may be shaped and configured to automatically retain and secure the retainer springs within the connector housing, while other types of retainer springs and connector housings may utilize a deformation of the connector housing (e.g., cold staking) to secure the retainer spring into the housing. In any case, the retainer springs are secured within the housing.

At block 2208, a gasket (e.g., the gasket 1402 of FIGS. 14 and 17) is inserted into a circuit board chamber (e.g., the chamber 402 of FIGS. 4, 11B, 14, and 16-19). At block 2210, a circuit board (e.g., the circuit board 1202 of FIGS. 12-14, 17, and 19) is inserted into the circuit board chamber. In various embodiments, the gasket and the circuit board may be inserted together after being adhered to one another or may be inserted separately. At block 2212, the circuit board may be secured within the connector housing. For example, as disclosed herein, posts such as the posts 404 may be cold staked to form around and secure the circuit board.

At block 2214, a circuit board chamber cover (e.g., the bottom cover 502 of FIGS. 5, 11A, 14, 17, and 19) may be placed and sealed over the circuit board chamber to protect the circuit board.

At block 2216, a wire may be inserted into an electrical contact, and the electrical contact may be inserted into a backend opening of a connector housing at block 2218. At block 2220, a frontend opening of the connector housing may be mated to a second connector housing as disclosed herein. In various embodiments, the blocks 2216, 2218, and 2220 may be performed by a first user in the field using the electrical connector, while the other blocks may be performed by one or more other individuals at a manufacturing facility where the electrical connectors are manufactured.

Figure 23:
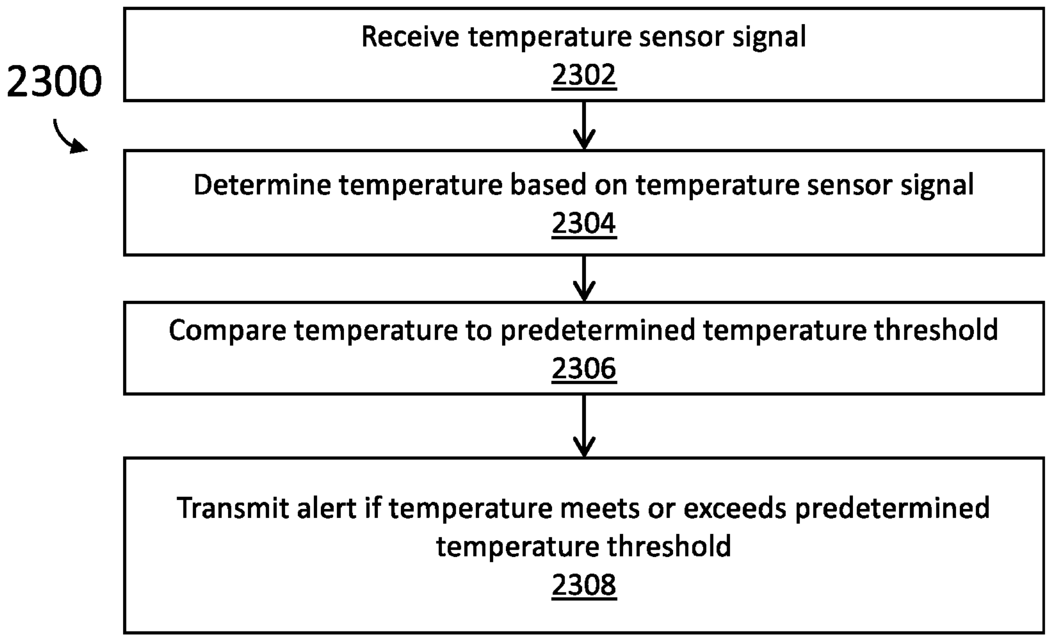
FIG. 23 is a flow chart illustrating an example method for determining a temperature at an electrical connector in accordance with the teachings of the present disclosure.

FIG. 23 is a flow chart illustrating an example method 2300 for determining a temperature at an electrical connector in accordance with the teachings of the present disclosure. At block 2302, a temperature sensor signal is received, for example, at a processor such as the processor 2102 of FIG. 21. Based on that signal, the processor may determine the temperature at a temperature sensor associated with the temperature sensor signal and based on the temperature sensor signal. In some embodiments, the temperature sensor signal itself may indicate the temperature to be determined, while in other embodiments the processor may have to perform additional processing on the temperature sensor signal to determine the temperature at the associated temperature sensor. Whether additional processing is used may depend, for example on the type of temperature sensor used.

At block 2306, the determine temperature from the block 2304 may be compared to a predetermined temperature threshold to determine if a condition is unsafe and/or indicates conditions indicative of a potential thermal runaway event. The predetermined threshold temperature may be based on several different factors. For example, a placement of the temperature sensor may impact the predetermined threshold temperature. For example, a temperature may be measured at one or more of a surface of one of the electrical leads 1206, a surface of one of the retainer springs 1302, or at a surface of the electrical contact 1502 within a connector housing. Because temperatures may be hottest at electrical contact (e.g., the electrical contact 1502), for example, measurements of temperature at an electrical lead or retainer spring may be compared to a lower predetermined threshold temperature than a measurement of temperature at the electrical contact would be compared to. Similarly, different locations within a connector housing or on surfaces outside or inside a connector housing may have different expected temperatures based on where a source of heat is that is indicative of a potential thermal runaway even. Thus, the predetermined temperature threshold may be configured based on a placement of a given temperature sensor. In addition, predetermined temperature thresholds may be configured based on a connector housing insulator type, connector amperage rating or other type or rating, connector housing thickness, connector housing material melting point, etc. In other words, the type of connector used and its intended use may indicate a capacity to withstand different temperatures, so the connector type and intended use may factor into setting a predetermined temperature threshold at which that connector may be safely used.

In various embodiments, a potential thermal runaway event may also be identified without using a predetermined temperature threshold or in addition to using a predetermined temperature threshold. For example, temperature sensed in or on a connector housing (or of a particular component within the connector housing) may be monitored over time, and significant deviations from a typical temperature over time may indicate a potential thermal runaway event or misuse of the electrical connector. In other words, a processor may, for example, determine a running or overall average temperature at which a connector is operated, and monitor the temperature of the connector for deviations at or above a certain threshold percentage or other metric above the average temperature. In this way, even if a predetermined temperature threshold is not set or determined that might indicate dangerous temperatures for a connector, a processor may still monitor a connector temperature for deviations in temperature that may be unsafe and/or may cause the connector to fail.

In various embodiments, a temperature sensor may also be configured to measure an environment temperature (e.g., ambient air temperature) in which a connector is located. For example, an ambient air temperature may be measured by a temperature sensor mounted on a circuit board or otherwise within a circuit board chamber (e.g., the chamber 402 disclosed herein). This may help determine what the predetermined threshold temperature used at the block 2306 should be, as hotter environments may make a connector more susceptible to thermal runaway events because heat may not dissipate as quickly from the connector itself. Accordingly, as described above, many different ways of determining that a temperature in or at a connector is unsafe may be utilized.

At block 2308, if it is determined that a temperature in a connector is above a predetermined temperature threshold (or if it is otherwise determined that the connector has reached a potentially unsafe temperature), an alert may be transmitted. The alert may be one or more of many different types of signals transmitted by a processor. For example, a signal may be sent to light on the connector to indicate that a condition is unsafe. An alert may be transmitted to another computing device through a wired or wireless connection. The other computing device may shut off power to the connector based on such an alert, for example, by shutting off a device the electrical connector is electrically connected to via a wire.

Accordingly, disclosed herein are various sensors and connector housing configurations for preventing thermal runaway events in an electrical connector. This can help identify instances of misuse of a connector (e.g., using a connector for a higher amperage than it is rated for), identify instances of mistakes made when using a connector (e.g., a bad crimp between and electrical contact and a wire), or identify when a device electrically connected with a connector is malfunctioning. Using the measurements of the connectors disclosed herein may also be used to prevent further damage (e.g., by shutting off a device associated with a connector in response to an alert or signal indicating a higher than desired temperature at a connector).

In addition, other aspects sensed at an electrical connector as disclosed herein may be useful in other ways. For example, voltage measured at an electrical contact may indicate a state or health of a battery to which the electrical contact is electrically connected to. Such a voltage measurement may also indicate a charge level of a battery. Similar to the alerts for temperature above, an alert may also be transmitted if a voltage meets or exceeds a first predetermined threshold or meets or is lower than a second predetermined threshold. In this way, if a voltage at a connector is undesirable or indicative of an undesirable condition elsewhere, an alert may be transmitted.

Figure 24:
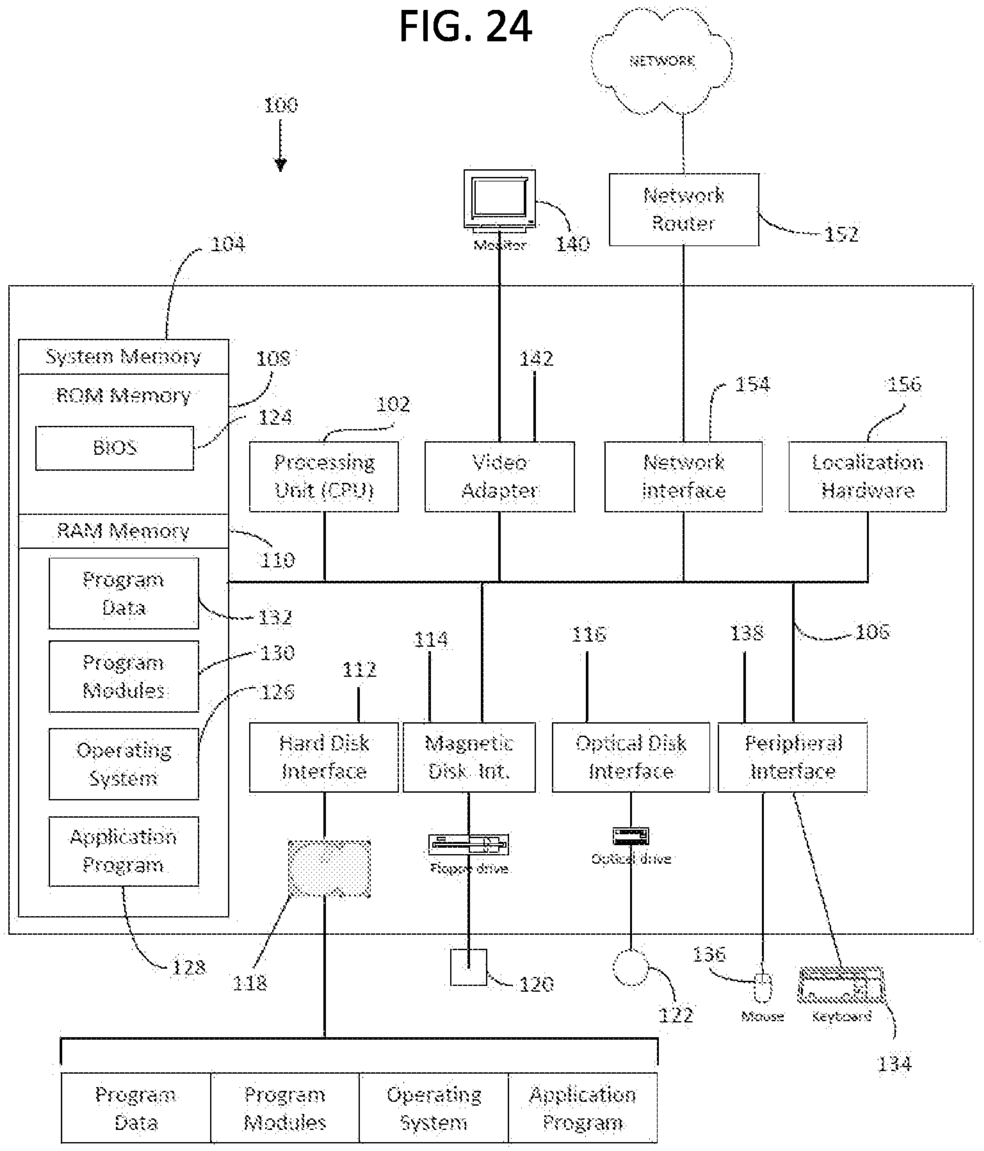
FIG. 24 is a diagrammatic view of an example of a user computing environment in accordance with the teachings of the present disclosure.

FIG. 24 is a diagrammatic view of an example of a user computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., the angle indicator display devices, the computing devices) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as “determining” or “outputting” or “transmitting” or “recording” or “locating” or “storing” or “displaying” or “receiving” or “recognizing” or “utilizing” or “generating” or “providing” or “accessing” or “checking” or “notifying” or “delivering” or the like, refer to the action and processes of a computer system, or similar electronic computing device, that manipulates and transforms data. The data is represented as physical (electronic) quantities within the computer system’s registers and memories and is transformed into other data similarly represented as physical quantities within the computer system memories or registers, or other such information storage, transmission, or display devices as described herein or otherwise understood to one of ordinary skill in the art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An electrical connector comprising:

a connector housing configured to receive at least one electrical contact;

a circuit board enclosed within the connector housing;

at least one electrical lead configured to electrically connect the circuit board to the at least one electrical contact;

at least one spring retainer fixed within the connector housing configured to lock the at least one electrical contact into the connector housing, the at least one spring retainer comprises a conductive metal, the at least one spring retainer is directly electrically connected to the at least one electrical contact, and the at least one electrical lead is directly electrically connected to the at least one spring retainer; and a first chamber configured to receive the at least one electrical contact and a second chamber containing the circuit board, and a passthrough connects the first chamber and the second chamber.

2. The electrical connector of claim 1, wherein the at least one electrical lead passes between the first chamber and the second chamber via the passthrough.

3. The electrical connector of claim 1, wherein the passthrough is formed in a bottom surface of the first chamber and a top surface of the second chamber.

4. The electrical connector of claim 3, further comprising a gasket located between the circuit board and the top surface of the second chamber.

5. The electrical connector of claim 4, wherein the gasket creates a seal between top surface of the second chamber and the circuit board, and further wherein the gasket comprises an opening that corresponds in shape to the passthrough.

6. The electrical connector of claim 3, wherein a bottom surface of the second chamber comprises a bottom cover sealed to the connector housing.

7. The electrical connector of claim 1, further comprising at least one signal pin connected to the circuit board, wherein the at least one signal pin extends from the circuit board to an interface configured to mate the at least one signal pin to a signal pin receiver of a second electrical connector.

8. The electrical connector of claim 7, wherein the electrical connector is a first flat-wiping connector and the second electrical connector is a second flat-wiping connector configured to mate with the first flat-wiping connector.

9. The electrical connector of claim 8, wherein the at least one signal pin is configured to mate to the signal pin receiver of the second electrical connector on a same side of the electrical connector that mates with at least one second electrical contact of the second electrical connector.

10. The electrical connector of claim 1, further comprising a wireless transmitter configured to communicate with a computing device external to the electrical connector.

11. The electrical connector of claim 1, further comprising a first radio-frequency identification (RFID) tag or reader fixed to the connector housing, wherein the first RFID tag or reader is configured to communicate with a second RFID tag or reader of a second electrical connector configured to mate with the electrical connector.

12. The electrical connector of claim 1, further comprising at least one temperature sensor in communication with the circuit board and configured to measure a temperature of at least one of:

the first chamber, the second chamber, a surface of an electrical contact inserted into the electrical connector, the at least one electrical lead, or the at least one spring retainer in the first chamber.

13. The electrical connector of claim 1, wherein the circuit board is powered via current received through the electrical lead from an electrical contact inserted into the electrical connector.

14. The electrical connector of claim 1, wherein the circuit board is configured to measure a voltage of an electrical contact inserted into the electrical connector via the electrical lead.

* * * * *